US011504719B2

(12) United States Patent
Handique et al.

(10) Patent No.: US 11,504,719 B2
(45) Date of Patent: Nov. 22, 2022

(54) SYSTEM AND METHOD FOR RECEIVING AND DELIVERING A FLUID FOR SAMPLE PROCESSING

(71) Applicant: Bio-Rad Laboratories, Inc., Hercules, CA (US)

(72) Inventors: Kalyan Handique, Ann Arbor, MI (US); Austin Payne, Ann Arbor, MI (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 279 days.

(21) Appl. No.: 16/816,817

(22) Filed: Mar. 12, 2020

(65) Prior Publication Data

US 2021/0283613 A1 Sep. 16, 2021

(51) Int. Cl.
*B01L 99/00* (2010.01)
*B01L 3/00* (2006.01)
*G01N 1/00* (2006.01)

(52) U.S. Cl.
CPC ....... *B01L 3/563* (2013.01); *B01L 2200/0684* (2013.01); *B01L 2300/165* (2013.01); *G01N 2001/002* (2013.01)

(58) Field of Classification Search
None
See application file for complete search history.

(56) References Cited

U.S. PATENT DOCUMENTS

| 4,475,411 A | 10/1984 | Wellerfors |
| 4,551,435 A | 11/1985 | Liberti et al. |
| 4,710,635 A | 12/1987 | Chupp |
| 5,266,269 A | 11/1993 | Niiyama et al. |

(Continued)

FOREIGN PATENT DOCUMENTS

| EP | 2414548 A2 | 2/2012 |
| EP | 2414548 B1 | 10/2015 |

(Continued)

OTHER PUBLICATIONS

Guo, P. et al. Microfluidic capture and release of bacteria in a conical nanopore array. Lab Chip. vol. 12, p. 558-561, 2012, published online Nov. 2011.

(Continued)

*Primary Examiner* — Paul S Hyun
(74) *Attorney, Agent, or Firm* — Jeffrey Schox

(57) ABSTRACT

A system and method for receiving and delivering a fluid, the system comprising: a body configured to interface with an opening of a reservoir and defining: a protrusion defining a set position of the body relative to the reservoir; a wall extending from the protrusion; a receiving surface coupled to the wall and sloping from an apex to a nadir along a first direction, the receiving surface comprising a vent; and an outlet positioned closer to the nadir than the apex of the receiving surface and displaced from the vent, the outlet comprising an extension from the body, the extension configured to contact an interior wall of the reservoir, wherein the body comprises: a bubble-mitigating operation mode in which the receiving surface receives and transmits the fluid along the receiving surface, and a fluid-transmitting operation mode in which the body directs the fluid along the interior wall of the reservoir.

11 Claims, 11 Drawing Sheets

(56) References Cited

U.S. PATENT DOCUMENTS

| | | |
|---|---|---|
| 5,491,343 A | 2/1996 | Brooker |
| 5,785,044 A * | 7/1998 | Meador ............... A61B 10/007 |
| | | 422/547 |
| 5,851,488 A | 12/1998 | Saul et al. |
| 5,883,370 A | 3/1999 | Walker et al. |
| 5,888,370 A | 3/1999 | Becker et al. |
| 5,993,630 A | 11/1999 | Becker et al. |
| 5,993,632 A | 11/1999 | Becker et al. |
| 6,016,712 A | 1/2000 | Warden et al. |
| 6,127,177 A | 10/2000 | Toner et al. |
| 6,133,030 A | 10/2000 | Bhatia et al. |
| 6,150,180 A | 11/2000 | Parce et al. |
| 6,174,683 B1 | 1/2001 | Hahn |
| 6,221,663 B1 | 4/2001 | Bhatia et al. |
| 6,228,624 B1 | 5/2001 | Terstappen |
| 6,281,008 B1 | 8/2001 | Komai et al. |
| 6,287,832 B1 | 9/2001 | Becker et al. |
| 6,365,362 B1 | 4/2002 | Terstappen et al. |
| 6,410,724 B1 | 6/2002 | Dejean et al. |
| 6,433,134 B1 | 8/2002 | Patron et al. |
| 6,525,997 B1 | 2/2003 | Narayanaswami et al. |
| 6,551,841 B1 | 4/2003 | Wilding et al. |
| 6,563,634 B2 | 5/2003 | Shimada et al. |
| 6,613,525 B2 | 9/2003 | Nelson et al. |
| 6,623,983 B1 | 9/2003 | Terstappen et al. |
| 6,641,708 B1 | 11/2003 | Becker et al. |
| 6,645,731 B2 | 11/2003 | Terstappen et al. |
| 6,692,952 B1 | 2/2004 | Braff et al. |
| 6,790,330 B2 | 9/2004 | Gascoyne et al. |
| 6,821,484 B1 | 11/2004 | Gregersen |
| 6,861,259 B2 | 3/2005 | Columbus |
| 6,960,449 B2 | 11/2005 | Wang et al. |
| 7,008,789 B2 | 3/2006 | Gambini et al. |
| 7,035,170 B2 | 4/2006 | Narayanaswami et al. |
| 7,046,357 B2 | 5/2006 | Weinberger et al. |
| 7,148,492 B2 | 12/2006 | Loney et al. |
| 7,172,866 B2 | 2/2007 | Hahn et al. |
| 7,198,901 B1 | 4/2007 | Rachlin |
| 7,217,520 B2 | 5/2007 | Tsinberg et al. |
| 7,238,521 B2 | 7/2007 | Hahn et al. |
| 7,248,352 B2 | 7/2007 | Hamamatsu et al. |
| 7,258,990 B2 | 8/2007 | Falcovitz-Gerassi et al. |
| 7,266,777 B2 | 9/2007 | Scott et al. |
| 7,294,468 B2 | 11/2007 | Bell et al. |
| 7,316,897 B2 | 1/2008 | Bisconte et al. |
| 7,332,288 B2 | 2/2008 | Terstappen et al. |
| 7,338,760 B2 | 3/2008 | Gong et al. |
| 7,354,389 B2 | 4/2008 | Kureshy et al. |
| 7,439,062 B2 | 10/2008 | Bhatt et al. |
| 7,449,558 B2 | 11/2008 | Yao et al. |
| 7,449,778 B2 | 11/2008 | Sander |
| 7,501,283 B2 | 3/2009 | Hersch et al. |
| 7,507,528 B2 | 3/2009 | Albert et al. |
| 7,588,672 B2 | 9/2009 | Unger et al. |
| 7,595,157 B2 | 9/2009 | Tsinberg |
| 7,597,528 B2 | 10/2009 | Rodi |
| 7,604,777 B2 | 10/2009 | Columbus |
| 7,638,464 B2 | 12/2009 | Fagnani et al. |
| 7,695,956 B2 | 4/2010 | Tsinberg et al. |
| 7,704,322 B2 | 4/2010 | Hansen et al. |
| 7,710,563 B2 | 5/2010 | Betzig et al. |
| 7,738,320 B2 | 6/2010 | Taha |
| 7,763,704 B2 | 7/2010 | Ding et al. |
| 7,767,152 B2 | 8/2010 | Stead et al. |
| 7,815,863 B2 | 10/2010 | Kagan et al. |
| 7,858,757 B2 | 12/2010 | Hollmann et al. |
| 7,863,012 B2 | 1/2011 | Rao et al. |
| 7,901,950 B2 | 3/2011 | Connelly et al. |
| 7,964,349 B2 | 6/2011 | Bell et al. |
| 3,008,032 A1 | 8/2011 | Forsyth et al. |
| 8,013,298 B2 | 9/2011 | Khursheed |
| 8,021,614 B2 | 9/2011 | Huang et al. |
| 8,103,080 B2 | 1/2012 | George et al. |
| 8,105,769 B2 | 1/2012 | Bell et al. |
| 8,105,780 B2 | 1/2012 | Su et al. |
| 8,131,053 B2 | 3/2012 | Ortyn et al. |
| 8,158,410 B2 | 4/2012 | Tang et al. |
| 8,174,698 B2 | 5/2012 | Peter et al. |
| 8,175,371 B2 | 5/2012 | George et al. |
| 8,186,913 B2 | 5/2012 | Toner et al. |
| 8,232,112 B2 | 7/2012 | Willson et al. |
| 8,252,517 B2 | 8/2012 | Thomas et al. |
| 8,293,524 B2 | 10/2012 | Ionescu-Zanetti et al. |
| 8,304,230 B2 | 11/2012 | Toner et al. |
| 8,329,422 B2 | 12/2012 | Rao et al. |
| 8,372,579 B2 | 2/2013 | Toner et al. |
| 8,372,584 B2 | 2/2013 | Shoemaker et al. |
| 8,406,498 B2 | 3/2013 | Ortyn et al. |
| 8,465,916 B2 | 6/2013 | Bell et al. |
| 8,628,923 B2 | 1/2014 | Hamilton et al. |
| 8,658,418 B2 | 2/2014 | Daridon |
| 8,680,025 B2 | 3/2014 | Cooney |
| 8,730,479 B2 | 5/2014 | Ness et al. |
| 8,765,454 B2 | 7/2014 | Zhou et al. |
| 8,771,609 B2 | 7/2014 | Ehben et al. |
| 8,802,367 B2 | 8/2014 | Taniguchi et al. |
| 8,936,945 B2 | 1/2015 | Handique et al. |
| 8,986,988 B2 | 3/2015 | Karnik et al. |
| 9,103,754 B2 | 8/2015 | Handique et al. |
| 9,110,026 B2 | 8/2015 | Collins |
| 9,133,499 B2 | 9/2015 | Di Carlo et al. |
| 9,145,540 B1 | 9/2015 | Deutsch et al. |
| 9,174,216 B2 | 11/2015 | Handique et al. |
| 9,188,586 B2 | 11/2015 | Fan et al. |
| 9,194,001 B2 | 11/2015 | Brenner |
| 9,200,245 B2 | 12/2015 | Deutsch et al. |
| 9,201,060 B2 | 12/2015 | Voldman et al. |
| 9,249,459 B2 | 2/2016 | Hamilton et al. |
| 9,260,753 B2 | 2/2016 | Xie et al. |
| 9,290,808 B2 | 3/2016 | Fodor et al. |
| 9,290,809 B2 | 3/2016 | Fodor et al. |
| 9,304,065 B2 | 4/2016 | Fowler et al. |
| 9,315,768 B2 | 4/2016 | Vrouwe et al. |
| 9,315,857 B2 | 4/2016 | Fu et al. |
| 9,329,170 B2 | 5/2016 | Clarke et al. |
| 9,364,829 B2 | 6/2016 | Heid et al. |
| 9,410,201 B2 | 8/2016 | Hindson et al. |
| 9,429,500 B2 | 8/2016 | Fowler et al. |
| 9,506,845 B2 | 11/2016 | Fowler et al. |
| 9,507,609 B2 | 11/2016 | Glazer et al. |
| 9,513,195 B2 | 12/2016 | Handique et al. |
| 9,567,645 B2 | 2/2017 | Fan et al. |
| 9,567,646 B2 | 2/2017 | Fan et al. |
| 9,598,736 B2 | 3/2017 | Fan et al. |
| 9,610,581 B2 | 4/2017 | Handique et al. |
| 9,637,799 B2 | 5/2017 | Fan et al. |
| 9,701,998 B2 | 7/2017 | Hindson et al. |
| 9,707,562 B2 | 7/2017 | Handique et al. |
| 9,708,659 B2 | 7/2017 | Fodor et al. |
| 9,757,707 B2 | 9/2017 | Husain et al. |
| 9,802,193 B2 | 10/2017 | Handique et al. |
| 9,840,732 B2 | 12/2017 | Anderson et al. |
| 9,845,502 B2 | 12/2017 | Fodor et al. |
| 9,850,483 B2 | 12/2017 | Clarke et al. |
| 9,952,126 B2 | 4/2018 | Fowler et al. |
| 9,995,662 B2 | 6/2018 | Husain et al. |
| 2002/0009759 A1 | 1/2002 | Terstappen et al. |
| 2002/0028431 A1 | 3/2002 | Julien |
| 2002/0036142 A1 | 3/2002 | Gascoyne et al. |
| 2002/0036823 A1 | 3/2002 | Shimada et al. |
| 2002/0098535 A1 | 7/2002 | Wang et al. |
| 2002/0109838 A1 | 8/2002 | Columbus |
| 2002/0119482 A1 | 8/2002 | Nelson et al. |
| 2002/0192808 A1 | 12/2002 | Gambini et al. |
| 2003/0129676 A1 | 7/2003 | Terstappen et al. |
| 2003/0138941 A1 | 7/2003 | Gong et al. |
| 2004/0029241 A1 | 2/2004 | Hahn et al. |
| 2004/0106130 A1 | 6/2004 | Besemer et al. |
| 2004/0160599 A1 | 8/2004 | Hamamatsu et al. |
| 2004/0191891 A1 | 9/2004 | Tsinberg et al. |
| 2004/0218472 A1 | 11/2004 | Narayanaswami et al. |
| 2004/0229349 A1 | 11/2004 | Daridon |
| 2004/0248318 A1 | 12/2004 | Weinberger et al. |
| 2005/0001176 A1 | 1/2005 | Loney et al. |

(56) References Cited

U.S. PATENT DOCUMENTS

| | | |
|---|---|---|
| 2005/0014201 A1 | 1/2005 | Deuthsch |
| 2005/0037343 A1 | 2/2005 | Fagnani et al. |
| 2005/0042685 A1 | 2/2005 | Albert et al. |
| 2005/0063863 A1 | 3/2005 | Columbus |
| 2005/0112589 A1 | 5/2005 | Hahn et al. |
| 2005/0118640 A1 | 6/2005 | Kureshy et al. |
| 2005/0158804 A1 | 7/2005 | Yao et al. |
| 2005/0164236 A1 | 7/2005 | Su et al. |
| 2005/0181463 A1 | 8/2005 | Rao et al. |
| 2005/0214173 A1 | 9/2005 | Facer et al. |
| 2005/0265815 A1 | 12/2005 | Rodi |
| 2006/0037915 A1 | 2/2006 | Strand et al. |
| 2006/0040274 A1 | 2/2006 | Tsinberg |
| 2006/0040407 A1 | 2/2006 | Falcovitz-Gerassi et al. |
| 2006/0050142 A1 | 3/2006 | Scott et al. |
| 2006/0115380 A1 | 6/2006 | Kagan et al. |
| 2006/0128006 A1 | 6/2006 | Gerhardt et al. |
| 2006/0141045 A1 | 6/2006 | Bhatt et al. |
| 2006/0147959 A1 | 7/2006 | Bell et al. |
| 2006/0160243 A1 | 7/2006 | Tang et al. |
| 2006/0257992 A1 | 11/2006 | McDevitt et al. |
| 2006/0263250 A1 | 11/2006 | Blouin et al. |
| 2007/0026381 A1 | 2/2007 | Huang et al. |
| 2007/0111302 A1 | 5/2007 | Handique et al. |
| 2007/0154960 A1 | 7/2007 | Connelly et al. |
| 2007/0161051 A1 | 7/2007 | Tsinberg et al. |
| 2007/0172903 A1 | 7/2007 | Toner et al. |
| 2007/0243523 A1 | 10/2007 | Ionescu-Zanetti et al. |
| 2007/0252265 A1 | 11/2007 | Sander |
| 2007/0264675 A1 | 11/2007 | Toner et al. |
| 2007/0275418 A1 | 11/2007 | Hollmann et al. |
| 2008/0003224 A1 | 1/2008 | Fong et al. |
| 2008/0014589 A1 | 1/2008 | Link et al. |
| 2008/0068588 A1 | 3/2008 | Hess et al. |
| 2008/0090239 A1 | 4/2008 | Shoemaker et al. |
| 2008/0096212 A1 | 4/2008 | Bell et al. |
| 2008/0113906 A1 | 5/2008 | Ding et al. |
| 2008/0182273 A1 | 7/2008 | Hansen et al. |
| 2008/0206751 A1 | 8/2008 | Squirrell et al. |
| 2008/0207615 A1 | 8/2008 | Bell et al. |
| 2008/0220422 A1 | 9/2008 | Shoemaker et al. |
| 2008/0234264 A1 | 9/2008 | Bell et al. |
| 2008/0240539 A1 | 10/2008 | George et al. |
| 2008/0317325 A1 | 12/2008 | Ortyn et al. |
| 2009/0014360 A1 | 1/2009 | Toner et al. |
| 2009/0061450 A1 | 3/2009 | Hunter |
| 2009/0081773 A1 | 3/2009 | Kaufman |
| 2009/0141593 A1 | 6/2009 | Taha |
| 2009/0153844 A1 | 6/2009 | Peter et al. |
| 2009/0215088 A1 | 8/2009 | Forsyth et al. |
| 2009/0317836 A1 | 12/2009 | Kuhn et al. |
| 2010/0120077 A1 | 5/2010 | Daridon |
| 2010/0127168 A1 | 5/2010 | Khursheed |
| 2010/0210009 A1 | 8/2010 | Willson et al. |
| 2010/0232675 A1 | 9/2010 | Ortyn et al. |
| 2010/0233693 A1 | 9/2010 | Kopf-Sill et al. |
| 2010/0261179 A1 | 10/2010 | Betley et al. |
| 2010/0291584 A1 | 11/2010 | Tseng et al. |
| 2010/0304485 A1 | 12/2010 | Karnik et al. |
| 2010/0304978 A1 | 12/2010 | Robbins et al. |
| 2011/0045994 A1 | 2/2011 | Voldman et al. |
| 2011/0053151 A1 | 3/2011 | Hansen et al. |
| 2011/0104718 A1 | 5/2011 | Rao et al. |
| 2011/0117634 A1 | 5/2011 | Halamish et al. |
| 2011/0143964 A1 | 6/2011 | Zhou et al. |
| 2011/0227558 A1 | 9/2011 | Mannion et al. |
| 2011/0280467 A1 | 11/2011 | George et al. |
| 2012/0071355 A9 | 3/2012 | Cooney |
| 2012/0129190 A1 | 5/2012 | Chiu et al. |
| 2012/0152369 A1 | 6/2012 | Hiddessen et al. |
| 2012/0156675 A1 | 6/2012 | Lueerssen et al. |
| 2012/0164679 A1 | 6/2012 | Vrouwe et al. |
| 2012/0194805 A1 | 8/2012 | Ness et al. |
| 2013/0171628 A1 | 7/2013 | Di et al. |
| 2013/0190212 A1 | 7/2013 | Handique et al. |
| 2013/0244906 A1 | 9/2013 | Collins |
| 2013/0287645 A1 | 10/2013 | Shaikh et al. |
| 2014/0161686 A1 | 6/2014 | Bort et al. |
| 2014/0173443 A1 | 6/2014 | Hawkins et al. |
| 2014/0213487 A1 | 7/2014 | Freudenthal et al. |
| 2014/0272965 A1 | 9/2014 | Handique et al. |
| 2014/0276216 A1* | 9/2014 | Lipinsky ............ A61B 10/007 600/573 |
| 2014/0315237 A1 | 10/2014 | Masujima et al. |
| 2014/0357511 A1 | 12/2014 | Handique et al. |
| 2014/0370612 A1 | 12/2014 | Bassler et al. |
| 2015/0089359 A1 | 3/2015 | Brisebois |
| 2015/0093306 A1 | 4/2015 | Thorne et al. |
| 2015/0133319 A1 | 5/2015 | Fu et al. |
| 2015/0160931 A1 | 6/2015 | Glazer et al. |
| 2015/0376609 A1 | 12/2015 | Hindson et al. |
| 2016/0024572 A1 | 1/2016 | Shishkin et al. |
| 2016/0024761 A1 | 1/2016 | Korb |
| 2016/0053253 A1 | 2/2016 | Salathia et al. |
| 2016/0060621 A1 | 3/2016 | Agresti et al. |
| 2016/0130649 A1 | 5/2016 | Xie et al. |
| 2016/0209319 A1 | 7/2016 | Adalsteinsson et al. |
| 2016/0251714 A1 | 9/2016 | Conant et al. |
| 2016/0289669 A1 | 10/2016 | Fan et al. |
| 2016/0314242 A1 | 10/2016 | Schnall-Levin et al. |
| 2017/0044525 A1 | 2/2017 | Kaper et al. |
| 2017/0307502 A1 | 10/2017 | Mason et al. |
| 2017/0320038 A1 | 11/2017 | Husain et al. |
| 2017/0321252 A1 | 11/2017 | Hindson et al. |
| 2017/0335385 A1 | 11/2017 | Hindson et al. |
| 2017/0356027 A1 | 12/2017 | Hindson et al. |
| 2018/0030515 A1 | 2/2018 | Regev et al. |
| 2018/0037942 A1 | 2/2018 | Fu |
| 2018/0051321 A1 | 2/2018 | Hindson et al. |
| 2018/0080075 A1 | 3/2018 | Brenner et al. |
| 2018/0094298 A1 | 4/2018 | Hindson et al. |
| 2018/0094312 A1 | 4/2018 | Hindson et al. |
| 2018/0105808 A1 | 4/2018 | Mikkelsen et al. |
| 2018/0112266 A1 | 4/2018 | Hindson et al. |
| 2018/0127744 A1 | 5/2018 | Hu et al. |
| 2018/0127823 A1 | 5/2018 | Shekhar et al. |
| 2018/0274027 A1 | 9/2018 | Hindson et al. |
| 2018/0282804 A1 | 10/2018 | Hindson et al. |
| 2021/0252509 A1 | 8/2021 | Szita et al. |

FOREIGN PATENT DOCUMENTS

| | | |
|---|---|---|
| JP | 2006098696 A | 4/2006 |
| WO | 2003035909 A2 | 5/2003 |
| WO | 2006098696 A1 | 9/2006 |
| WO | 2007044917 A2 | 4/2007 |
| WO | 2010120818 A2 | 10/2010 |
| WO | 2018013723 A1 | 1/2018 |
| WO | 2018058073 A2 | 3/2018 |

OTHER PUBLICATIONS

International Search Report and Written Opinion for PCT Application No. PCT/US17/62099 dated Feb. 12, 2018.

Lindstrom, Sara (Royal Institute of Technology, Stockholm, Sweden, 2009, pp. 1-80).

Seale, K. T. et al. "Mirrored pyramidal wells for simultaneous multiple vantage point microscopy." Journal of Microscopy (2008) 232 1-6. (Year: 2008).

Sugio, Yoshihiro; et al., An agar-based on-chip neural-cell-cultivation system for stepwise control of network pattern generation during cultivation, Dept. of Life Sciences, Graduate School of Arts and Sciences, University of Tokyo, Jun. 24, 2003.

Supplemental information from Tan et al. PNAS (2007) 104. (Year: 2007).

Tan, Wei-Heang et al. "A trap-and-release integrated microfluidic system for dynamic microarray applications." PNAS (2007) 104 1146-1151. (Year: 2007).

* cited by examiner (Dimensions and angles may vary, as described)

(Dimensions and angles may vary, as described)

SYSTEM AND METHOD FOR RECEIVING AND DELIVERING A FLUID FOR SAMPLE PROCESSING

TECHNICAL FIELD

This invention relates generally to the sample processing field, and more specifically to a new and useful system and method for fluid delivery in the sample processing field.

BACKGROUND

With an increased interest in cell-specific drug testing, diagnosis, and other assays, systems and methods that allow for individual cell processing are becoming highly desirable. Systems and methods for single cell capture and processing have been shown to be particularly advantageous for these applications. However, associated processes and protocols for single cell capture, processing, and analysis often must be performed in a particular order and with a high precision in order to properly maintain the cells. As such, these processes can be time consuming for the user, as well as result in damage to the cells or otherwise unfavorable results if they are not performed properly (e.g., through mistakes in pipetting, through a mix-up of reagents, etc.).

Furthermore, in relation to delivery of sample fluids and/or other process fluids for sample processing to a device for single-cell capture and processing, systems and method for delivery are currently insufficient in relation to delivery of such fluids in a desired state (e.g., a state without features, such as bubbles, that could adversely affect processing).

Thus, there is a need in the sample processing field to create a new and useful system and method for fluid delivery.

DESCRIPTION OF THE PREFERRED EMBODIMENTS

Figure 1A:
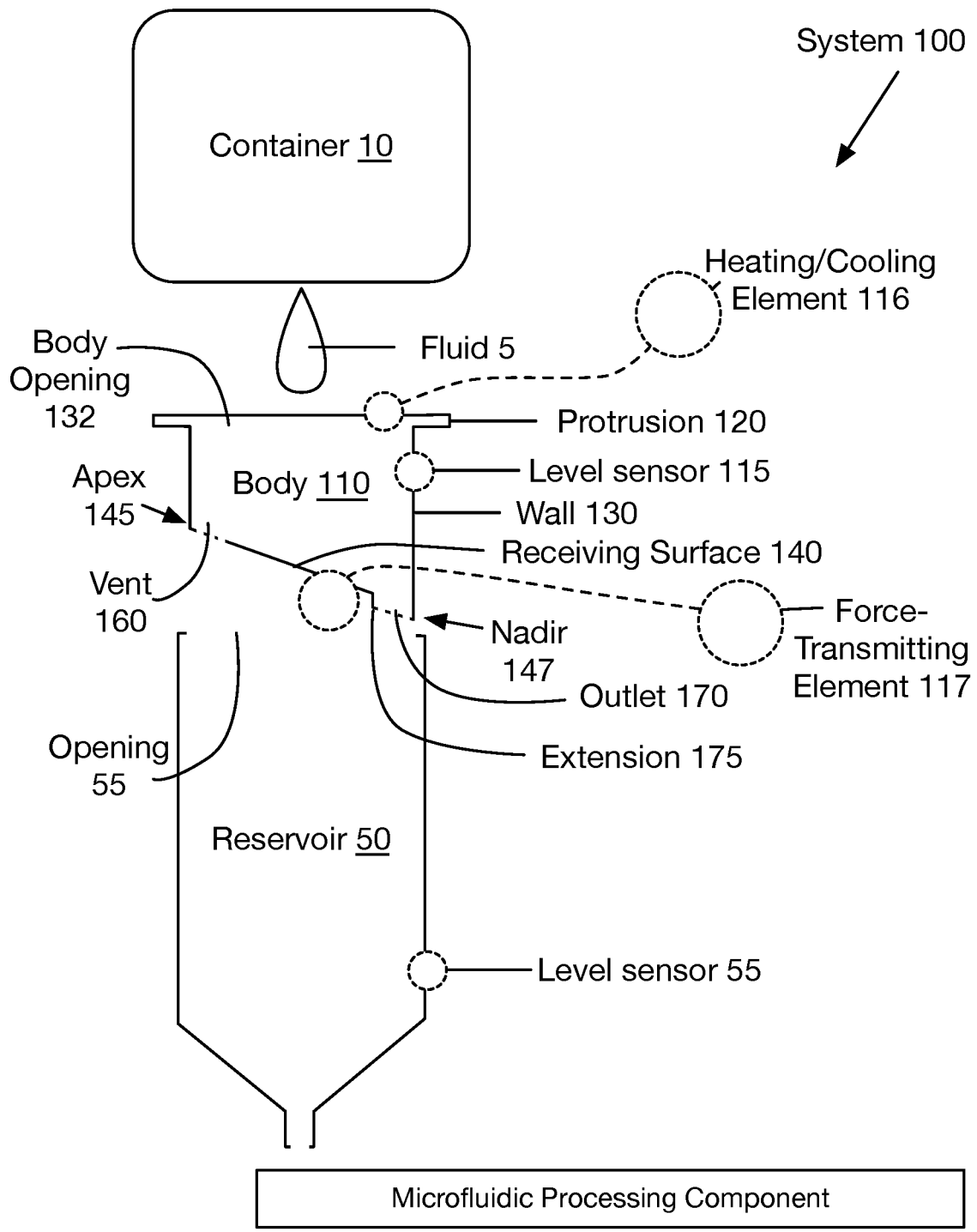
FIG. 1A depicts an embodiment of a system for receiving and delivering a fluid.

The following description of the preferred embodiments of the invention is not intended to limit the invention to these preferred embodiments, but rather to enable any person skilled in the art to make and use this invention.

1. Benefits

The system and method can confer several benefits over conventional systems and methods.

One or more embodiments of the system(s) and method(s) described can confer the benefit of significantly removing or reducing in number a distribution of bubbles from within a fluid, where the fluid is intended to be transmitted into microfluidic structures of a device for processing cells/particles in single-cell/single-particle format. As such, the invention(s) described can significantly improve reliability and efficiency of sample processing, by producing consistently usable results.

One or more embodiments of the system(s) and method(s) described can additionally or alternatively confer the benefit of enabling an operator to purchase smaller volumes of reagents, such as through the distribution of reagents in protocol-specific types and quantities to be used in accordance with specific protocols, due to reduced waste attributed to the invention(s). This can function to save costs, reduce reagent waste, or have another desired outcome.

In variations associated with related system components, the system(s) and method(s) described can additionally or alternatively confer the benefit of enabling at least partial automation of the protocols involved in single cell capture and subsequent processing. In a first example, the user can be removed from part or all of the method (e.g. loading samples, capping lids, etc.). In a second example, the system and/or method can enable better accuracy of a protocol over conventional systems and methods (e.g. better accuracy in the addition of the correct reagents, better temperature control of reagents, automated bar code reading, etc.). In a third example, the system and/or method can confer the benefit of preventing accidents (e.g. knocking the system, spills of reagents, etc.), which can commonly occur during the manual performance of a protocol.

In variations associated with related system components, the system(s) and method(s) described can additionally or alternatively confer the benefit of establishing better fluid flow throughout the system, with fewer fluid-related artifacts. Additionally or alternatively, the system can monitor and/or direct fluid flow with user intervention (e.g., with minimal user intervention, to encourage optimal user intervention, etc.).

In a variations, the system(s) and/or method(s) described can additionally or alternatively confer the benefit of independent or nearly independent control of reagents or reagent groups. In a specific example of this variation, the system includes a reagent cassette having any or all of the following dedicated regions: a room temperature region, a cooling region, a heating region, a magnetic region (e.g., overlapping with a heating region), or any other suitable region.

Additionally or alternatively, the system and/or method can confer any other suitable benefit.

2. System

As shown in FIG. 1A, an embodiment of a system 100 for receiving and delivering a fluid 5 includes: a body no configured to interface with an opening 55 of a reservoir 50 and defining: a protrusion 120 defining a set position of the body 110 relative to the opening 55 of the reservoir 50; a wall 130 extending from the protrusion 120; a receiving surface 140 coupled to the wall and sloping from an apex 145 to a nadir 147 along a first direction, the receiving surface comprising a vent 160; and an outlet 170 positioned closer to the nadir 147 than the apex 145 of the receiving surface 140 and displaced from the vent 160, the outlet 170 comprising an extension 175 from the body 110, the extension 175 configured to contact an interior wall 57 of the reservoir 50.

Figure 1B:
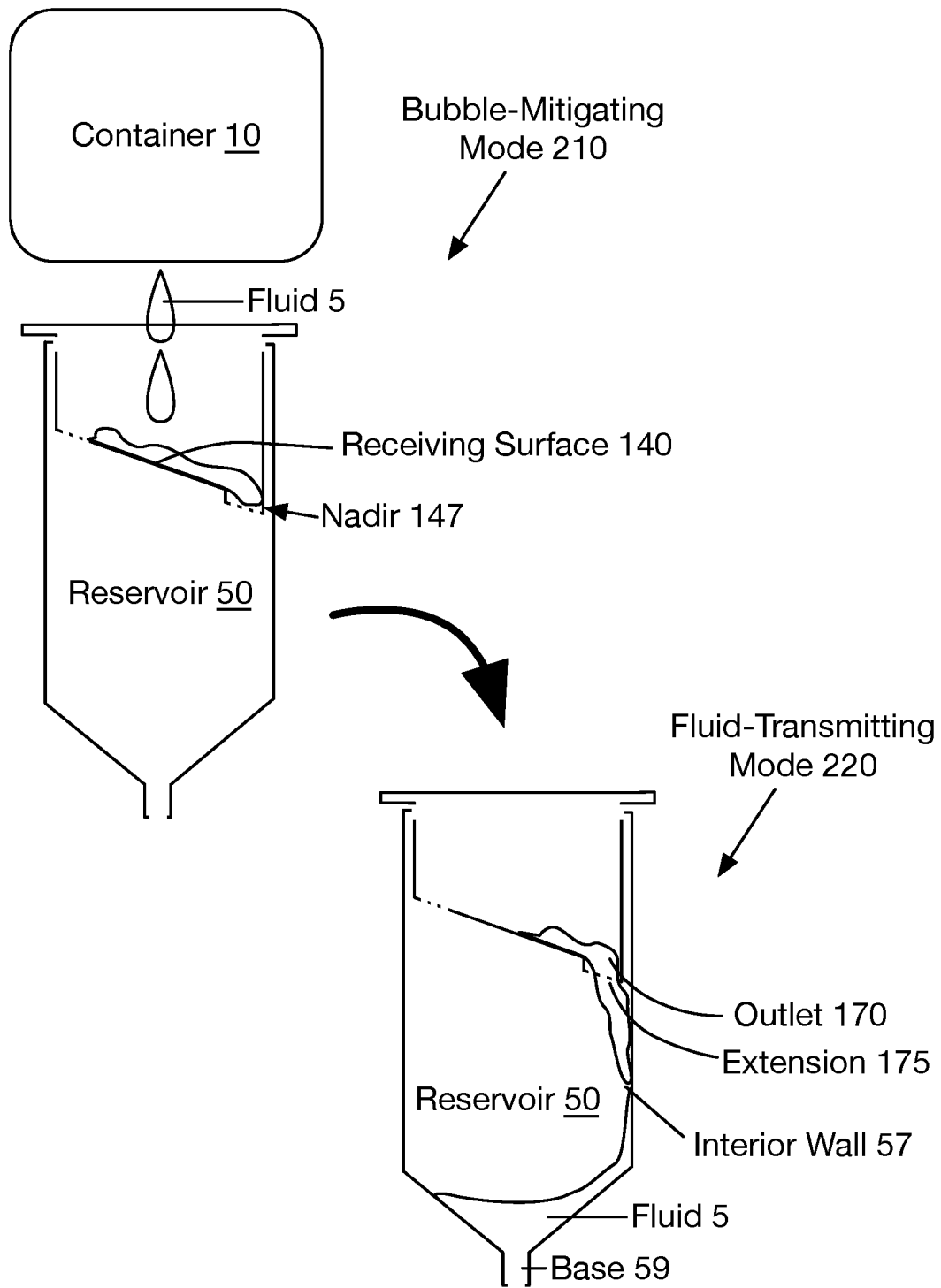
FIG. 1B depicts embodiments of operation modes of a system for receiving and delivering a fluid.

In various modes, of operation, the system 100 has specific structural configurations that transmit fluid, initially having a distribution of bubbles either inherently present during packaging or storage and/or created during its transfer, to downstream fluid containers and channels in a substantially bubble-free (or bubble-reduced) state. In one such embodiment, as shown in FIG. 1B, the system 100 can include: a bubble-mitigating operation mode 210 in which the receiving surface 140 receives the fluid 5 from a container 10 elevated above the body 110 and transmits the fluid 5 along the receiving surface 140 toward the nadir 147, thereby transitioning the fluid 5 from a bubble-rich state to a reduced-bubble state, and a fluid-transmitting operation mode 220 in which the body 140 directs the fluid 5, in the reduced-bubble state, through the outlet 170, along the extension 175, and along the interior wall 57 of the reservoir 50 toward a base 59 of the reservoir 50 in a bubble-free state.

The system can further additionally or alternatively include any or all of the system components as described in U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; U.S. application Ser. No. 15/815,532, filed 16 Nov. 2017; U.S. application Ser. No. 16/115,370, filed 28 Aug. 2018, and U.S. application Ser. No. 16/564,375, filed 9 Sep. 2019, which are each incorporated in their entirety by this reference.

The system 100 functions to significantly remove or reduce in number a distribution of bubbles from within a fluid, where the fluid is intended to be transmitted into microfluidic structures of a device for processing cells in single-cell format. As such, the system provides structures that receive a sample processing fluid having bubbles, efficiently removes bubbles from the sample processing fluid, and ultimately transmits the sample processing fluid toward microfluidic structures to improve sample processing outcomes.

In variations, the system 100 is configured to interface with a reservoir coupled to a manifold (described in further detail below) for distributing a sample processing fluid and/or sample to a microfluidic chip for processing samples in single cell format. As such, the system 110 can provide an intermediate structure that receives one or more sample fluids or reagents from a fluid container, positively affects characteristics of the fluid(s), and further transmits the fluid(s) downstream.

In variations, the system 100 is configured to process sample fluids (e.g., samples derived from or containing cells and/or tissues, organic material, inorganic material, etc.); sample fluids derived from biological samples containing cell-free biomarkers (e.g., DNA, RNA, proteins, exosomes, lipids, metabolites, glycans); sample fluids derived from environmental samples, food samples; and/or sample processing fluids. In examples, sample processing fluids can include reagents including buffers (e.g., priming, wash, and permeabilization buffers), fixing solutions (e.g., pre-fixing and post-fixing solutions), and cocktails (e.g., lysis, inhibitor, nucleic acid reactants, amplification cocktails, nucleic acid interacting enzymes, oligonucleotide tags, probes, primers, primary antibody, and secondary antibody cocktails), and can additionally or alternatively include stains (e.g., fluorescent stains or histological stains) and any other suitable fluids for cell capture or analysis. In a first example, sample processing fluids can include reagents used to perform on-chip cDNA synthesis from captured mRNA, including lysis buffers, RNase inhibitors, and dNTPs. In a second example, sample processing fluids can include reagents used to perform exonuclease treatment of the contents within the array of wells to remove any single-stranded oligonucleotide sequence (e.g., from a captured population of particles containing oligonucleotide probes). In a third example, sample processing fluids can include reagents for cDNA amplification using PCR master mix, dNTPs and primer sets. In a fourth example, sample processing fluids can include reagents for targeted amplification of products (e.g., genetic material, set of genetic complexes produced in variations of method 200) from the nucleic acid recovered from single cells. In a fifth example, sample processing fluids can include enzyme mixes and oligonucleotide sequences for ligating specific oligonucleotide sequences to single cell DNA or RNA. In a sixth example, sample processing fluids can include enzymes mixes for tagmentation and labeling of nucleic acids. In a seventh example, sample processing fluids can include reagents that contain a population of SPRI beads used for size-based purification and elution of nucleic acids of specific base pair lengths. However, sample processing fluids can be otherwise configured and can include any other suitable combination of reagents for any assay that can be performed by system 100 and/or methods described. In variations of the system 100 configured to further promote purification of captured cells by magnetic separation, sample processing fluids can also comprise solutions of magnetic beads coupled with affinity molecules configured to bind to components of interest (e.g., undesired cells, fragments, waste products) within a biological sample.

2.1. System—Body and Reservoir

As shown in FIG. 1A, the system includes a body 110 configured to interface with an opening 55 of a reservoir 50 and defining: a protrusion 120 defining a set position of the body 110 relative to the opening 55 of the reservoir 50; and a wall 130 extending from the protrusion 120. The body 110 functions to interface with the reservoir 50, in order to receive a fluid and deliver the fluid into the reservoir for eventual transmission into a microfluidic structure for processing cells in single-cell format. However, in variations, the body 110 can be configured to interface with another system element for fluid transmission.

In material composition, the body 110 can be composed of one or more of: a polymer (e.g., polypropylene, polydimethylsiloxane, polystyrene, polyvinyl chloride, polymethyl methacrylate, cyclic olefin copolymer, polycarbonate), a silicon-derived material, glass, a metallic material, a ceramic material, a natural material, a synthetic material, and/or any suitable material. In particular, material selection can be based upon one or more of: manufacturing considerations, surface properties desirable for sample processing, thermal properties, mechanical properties, optical properties, and/or any other suitable properties. Furthermore, all parts of the body 110 can be constructed using the same material(s), different materials (e.g., if each portion of the body 110 has different design constraints), and/or any combination of materials. Furthermore, the body 110 can be a unitary body, or a body 110 having discrete portions that are coupled together (e.g., during manufacturing).

In relation to surface properties, the material(s) of the body 110 can be configured with desired hydrophilic/hydrophobic properties (e.g., a high degree of hydrophobicity) determined by, for instance, contact angle and wettability characteristics. In relation to other electrical and physical properties, the material(s) of the body 110 can be configured with a desired charge (e.g., in relation to characteristics of sample fluids and/or sample processing fluids used), electric field characteristics, conductivity, resistance, and/or any other suitable surface or physical characteristics. Additionally or alternatively, the material(s) of the body 110 are preferably configured to be non-reactive with the fluid. Additionally or alternatively the surface of the body exposed to receiving fluid may have desired surface finish.

In relation to thermal properties, the material(s) of the body 110 can be configured with desired thermal properties, with respect to heat transfer and/or heat retention characteristics. In particular, the body no can be configured with desired thermal conductivity and/or heat capacity characteristics. In one variation, the body no can be configured with low thermal conductivity (e.g., as an insulative material), such that the material does not significantly affect temperatures of the fluids it contacts during operation. In another variation, the body no can be configured with thermal properties such that it can efficiently transfer heat to or away from fluids contacting the body no. For instance, in variations where the body no is coupled to a heating or cooling element 116 (as shown in FIG. 1A), the body no can be configured to facilitate transfer of heat away from fluids, such as lysis buffers and/or other buffers (e.g., to cool them down or keep them cool), and/or transfer of heat to the fluids (e.g., to heat them or keep them at a desired temperature). However, the body no can have other suitable thermal properties based on application of use.

In relation to optical properties, the material(s) of the body 110 can have any degree of transparency, reflectivity, or other optical characteristics. For instance, materials are can be transparent to enable optical analysis, interrogation, or observation, but can be opaque, transparent, translucent, and/or any suitable opacity.

In relation to mechanical properties, material(s) of the body can be configured with desired mechanical properties, including one or more of: stiffness, strength, elastic behavior, hardness, and other properties.

Figure 2A:
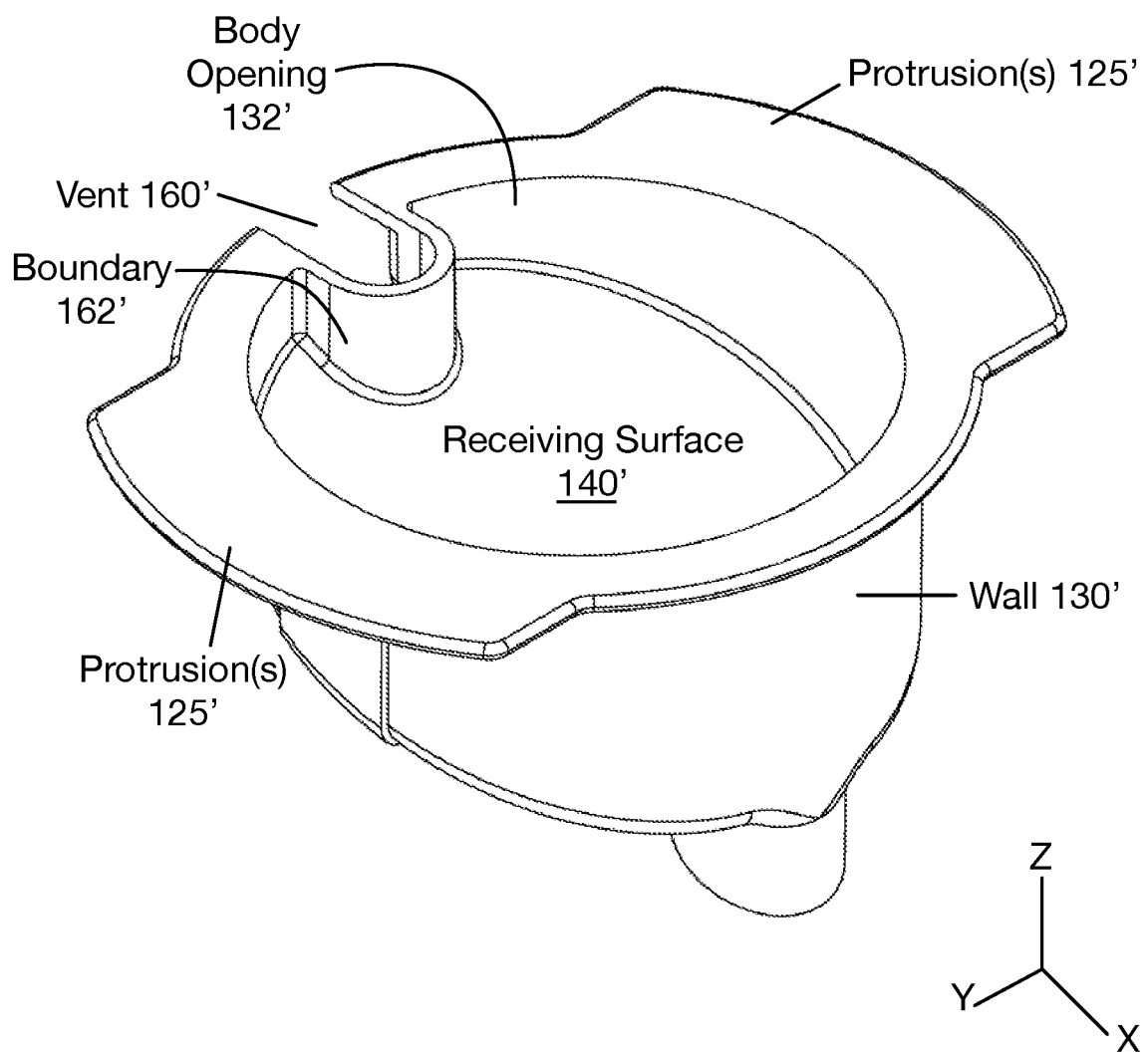
FIGS. 2A-2C depict specific examples of a system for receiving and delivering a fluid.

As shown in FIG. 1A, the body 110 includes a protrusion 120 defining a set position of the body 110 relative to the opening 55 of a reservoir 50 (described in more detail below). The protrusion 120 functions to facilitate retention of the body 110 relative to the reservoir 50 in a desired position, such that the body 110 does not move into or out of the reservoir 50 in an undesired manner during operation. In the orientation shown in FIG. 1A, the protrusion can be configured to extend laterally or radially from a boundary of the body 110 (such as wall 130 described in more detail below). In one variation, an example of which is shown in FIG. 2A, the protrusion 120 includes one or more protrusions 125' extending laterally from the body 110, where the protrusions (e.g., wings) 125 extend beyond a perimeter or other boundary of an opening of the reservoir 50, in order to allow the body 110 to be seated within the reservoir 50. However, variations of the protrusion 120 can alternatively be configured in another suitable manner (e.g., as a lip extending from a wall of the body 110). In the example shown in FIG. 2A, the protrusion 125' is positioned at a superior portion (e.g., topmost portion in the orientation shown in FIG. 2A) of the body 110; however, in other variations, the protrusion 120 can be positioned at another portion of the body 110 (e.g., at an intermediate position along the wall 130, at a bottom portion of the wall 130, etc.).

In variations of the protrusion 120, the body 110 can be configured to have a set position relative to the reservoir 50 in another suitable manner. For instance, in one variation, the body 110 and/or the reservoir 50 can include paired magnetic elements that facilitate retention of the body 110 in position (e.g., the body 110 can sit within the reservoir 50 or surround the reservoir as a cap, with attractive forces, such as magnetic forces, defining the set position). In another variation, the body 110 and the reservoir 50 can maintain desired positions relative to each other by way of a press fit. In another variation, the body 110 and the reservoir 50 are bonded together by variety of means including one or more of: thermal bonding, glue bonding, laser bonding, ultrasonic bonding, and threaded bonding. In another variation, the body 100 and the reservoir 50 are reversibly mated. In one example, an interior portion of the reservoir 50 can taper from a larger dimension (e.g., diameter, width) to a smaller dimension (e.g., diameter, width), and the body 110 can have a morphology (e.g., diameter, width) that properly seats the body 110 within the reservoir at a desired position (e.g., with features that facilitate removal of the body 110 from the reservoir 50, if desired). In another variation, the body 110 and the reservoir 50 can maintain desired positions relative to each other by way of a snap fit. In one example, an interior or exterior portion of the reservoir 50 can include a protrusion or a recess forming a first part of a snap fit mechanism, and an interior or exterior portion of the body 110 can include a complementary recess or complementary protrusion forming a second part of the snap fit mechanism. In still other variations, the body 110 and the reservoir 50 can maintain desired positions relative to each other by way of another mechanism (e.g., adhesive, screw-type mechanism, ratchet type mechanism, etc.).

As shown in FIG. 1A, the body 110 includes a wall 130 extending from the protrusion 120, where the wall 130 functions to temporarily contain a volume of the sample fluid or sample processing fluid within the body 110 until bubbles have been removed from the fluid. The wall 130 also functions to separate the sample fluid or sample processing fluid from contacting or entering the reservoir prematurely.

With the receiving surface 140 described below, the wall 130 defines a volume for retaining fluid that falls to or is otherwise transmitted from a container to the body 110 for bubble removal and further transmission. In variations, the volume defined by the wall and the receiving surface 140 can have a capacity from 1 to 50 milliliters, or alternatively another suitable volume.

Figure 2B:
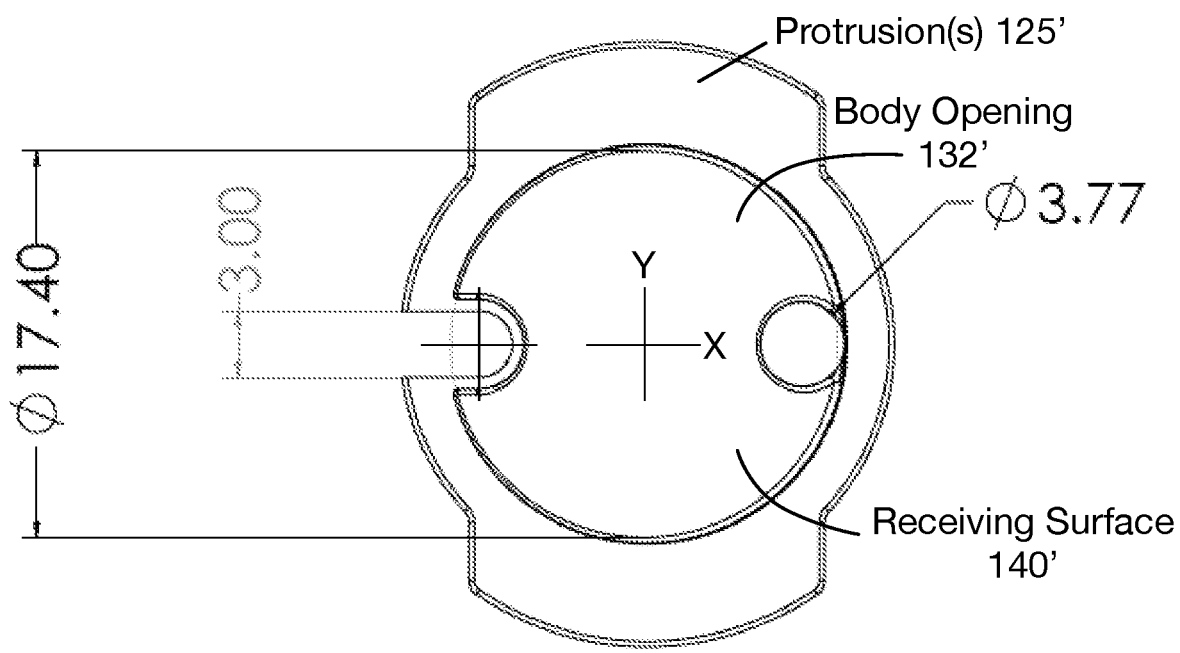
Figure 2B:
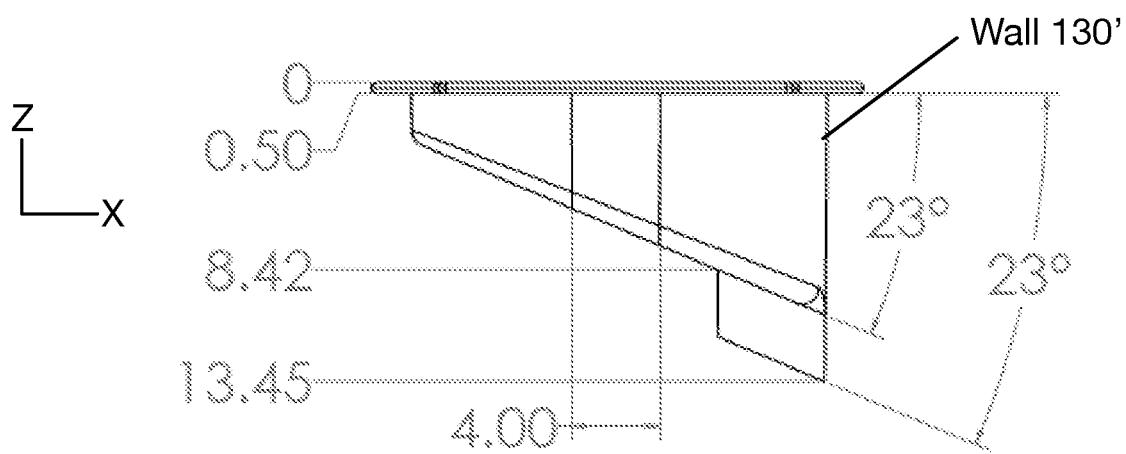

In morphology, the wall 130 can define an opening 132 at a superior portion of the body 110, where the opening allows the sample fluid or sample processing fluid to enter the body 110 and contact the receiving surface 140 described in more detail below. In variations, the opening can have a width or diameter from 5-50 mm, and be polygonal, circular, ellipsoidal, or amorphous. In a specific example, as shown in FIGS. 2A and 2B, the opening 132' is a predominantly circular opening (e.g., circular aside from features described in more detail below) having a diameter of 17.40 mm; however, in variations of the specific example, the opening 132 can have another suitable morphology and dimensions. Furthermore, the opening 132 of the body 110 can be open to atmospheric pressure, or can alternatively be configured at another pressure (e.g., in embodiments where the system 100 and associated components, such as the reservoir 50 and elevated container are at other pressure(s)).

Related to the shape of the opening 132, the wall 130 can provide a boundary morphology corresponding to the opening 132. For instance, in variations wherein the opening 132 is circular or ellipsoidal, the wall 130 can at least partially define a cylindrical or ellipsoidal-tubular boundary. Additionally or alternatively, in variations wherein the opening 132 is polygonal, the wall 130 can at least partially define a polygonal-tubular boundary. The wall 130 can be uniform in cross section along the length of the wall, or can be non-uniform along its length.

In morphology, the wall 130 can have a thickness that provides structural rigidity and reliable separation of contents of the body 110 from the reservoir 50. In variations, the thickness of the wall 130 can vary from 0.25 mm to 3 mm; in a specific example, the thickness of the wall 130 is 0.5 mm. However, variations of the wall 130 can have another suitable thickness.

In morphology, the wall 130 has a length terminating at a surface of the receiving surface 140 described below. As such, the wall 130 can have a length that varies about the boundary of the wall 130. In variations, the length of the wall 130 can be from 0 to 50 mm; however, the wall 130 can have another suitable length or variable length about its boundary. In the specific example shown in FIG. 2B, the wall 130' has a length of 2 mm at a region corresponding to the apex 145 of the receiving surface 140 described in more detail below. And a length of 9 mm at a region corresponding to the nadir 147 of the receiving surface 140 described in more detail below. However, variations of the wall 130 can have another suitable length.

Figure 3:
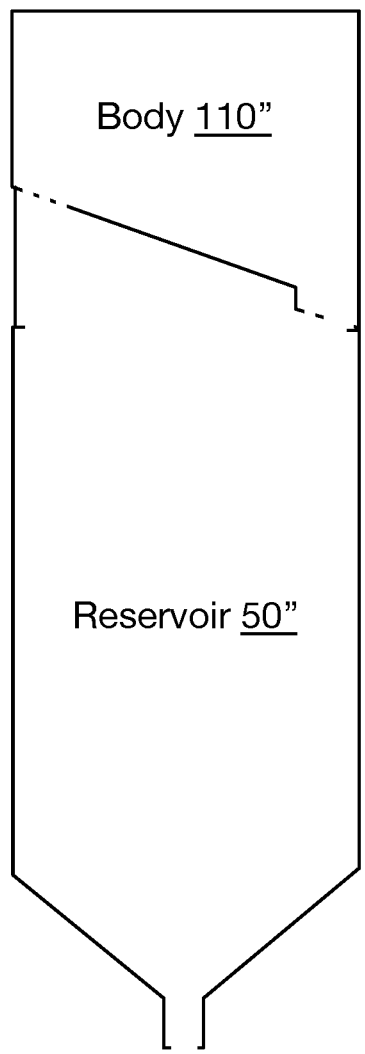
FIG. 3 depicts a variation of a portion of a system for receiving and delivering a fluid.

In relation to the reservoir 50 described below in Section 2.1.1, the wall 130 can be configured to at least partially seat the body 110 within the reservoir, such that the receiving surface 140 is positioned within the reservoir 50; however, in other variations, the body 110" may not be seated within the reservoir and can be configured to be positioned above the reservoir 50", a variation of which is shown in FIG. 3.

2.2.1 Reservoir Details

In relation to the reservoir 50, the reservoir 50 is a container that receives sample fluid and/or other sample processing fluids and transmits such fluids downstream (e.g., to a manifold, to a chip for processing cells in single-cell format, etc.) for further use. In embodiments, the reservoir 50 includes a reservoir inlet and a reservoir outlet, and is coupled to a manifold. In order to receive fluids, the inlet of the reservoir provides an opening (e.g., which receives fluid from the body 110). In one variation, the reservoir inlet is circular and configured to receive at least a portion of the body 110; however, in other variations, the reservoir inlet can have another suitable morphology.

In variations, the reservoir 50 and/or body 110 can further include a level sensor 115, 55 (in FIG. 1A), configured to detect fluid level within the reservoir 50/body 110, which functions to facilitate determination of characteristics of fluids received and/or prevent bubbles from entering downstream portions of the system. As such, the level sensor can generate a signal upon detection of a trigger fluid level (e.g., a low fluid level as a threshold), and transmit the signal to a processor configured to receive the signal and generate a command to control fluid delivery into the manifold based upon the signal. The command can be used to automatically stop fluid flow from the reservoir into the manifold, or can function to implement control of fluid flow in any other suitable manner. The reservoir 50 functions to receive a biological sample including cells of interest and/or at least one fluid, and to deliver the biological sample and at least one fluid downstream to facilitate cell capture, processing, and/or analysis. The reservoir 50 may also function to receive a fluid (e.g., biological sample or sample treating reagent) to be stored in it for certain amount of residence time prior to the fluid being transferred into the microfluidic processing component. The reservoir may also be interrogated with other sensors such as optical sensors, CCD imagers, CMOS sensors such that the constituents of samples present in its fluid can be analyzed to create data set that may be relevant to the overall analysis of the sample.

In variations of the reservoir 50/body 110 comprising a level sensor, the level sensor can be a load cell, an ultrasonic level sensor, an infrared (IR) level sensor, an optical level sensor or any suitable signal configured to generate a signal when fluid level in the reservoir 50 passes a certain threshold. Detection of the signal can then generate a response to stop fluid flow within the system 100 and/or a response to add more fluid to the reservoir, thus preventing gas bubbles from being transmitted downstream. In a specific example, the reservoir 50 has a volumetric capacity greater than 6 mL and includes an opening to atmospheric pressure, wherein the opening can also couple to a syringe pump. In the specific example, the reservoir 50 further comprises an ultrasonic level sensor configured to generate a signal when fluid level in the reservoir 50 passes a certain threshold.

In one embodiment, the reservoir 130 includes an opening to atmospheric pressure, such that fluid delivery from the reservoir in an inlet-to-outlet direction is enabled by negative pressure applied by a pump coupled indirectly to the reservoir 50. In the first variation, the negative pressure applied can be reversed in order to facilitate flow in an outlet-to-inlet direction. In a second variation, the reservoir 50 may not include an opening to atmospheric pressure, but can alternatively be coupled to a pump configured to provide positive pressure and negative pressure at the reservoir 50, in order to facilitate flow in both an inlet-to-outlet direction and an outlet-to-inlet direction, respectively. In a specific example of the second variation, the reservoir 50 is coupled to a syringe pump configured to provide positive and negative pressure by manual pumping. Fluid delivery from the reservoir 50 downstream can, however, be performed in any alternative suitable manner.

Aspects of embodiments, variations, and examples of the reservoir 50 are further described in U.S. application Ser. No. 15/782,270 titled "System and Method for Capturing and Analyzing Cells" and filed on 12 Oct. 2017, which is herein incorporated in its entirety by this reference.

2.2 System—Receiving Surface, Vent, and Outlet

As shown in FIG. 1A, the body 110 further includes a receiving surface 140 coupled to the wall and sloping from an apex 145 to a nadir 147 along a first direction. The receiving surface 140 functions to receive a stream or other volume of fluid (e.g., from an elevated container or other container described in more detail below), and facilitate bubble removal from the fluid by transmitting it along the receiving surface 140 and through an outlet 170 (described in more detail), to the reservoir 50.

As shown in FIGS. 1A, and 2A-2C, the receiving surface 140, 140' slopes along a first direction (e.g., X direction shown in FIG. 1) from the apex 145 to the nadir 147 of the receiving surface. In relation to an elevation view parallel to the X-Z plane shown in FIG. 1, the receiving surface 140 can have a sloping angle from 10-90 degrees from the X axis, where the angle of the receiving surface 140 at least partially controls the rate at which fluid flows along the receiving surface 140. Furthermore, the sloping angle of the receiving surface 140 can be constant along a direction, or can alternatively be non-constant along the direction (e.g., such that the receiving surface is non-linear in cross section along the X-Z plane shown in FIG. 2B). In a specific example, as shown in FIG. 2B, the receiving surface 140 can have a sloping angle of 23 degrees from the X-axis, along the X-axis; however, in other variations, the receiving surface 140 can have another suitable sloping angle (e.g., larger sloping angle for higher viscosity fluids, etc.).

Figure 2C:
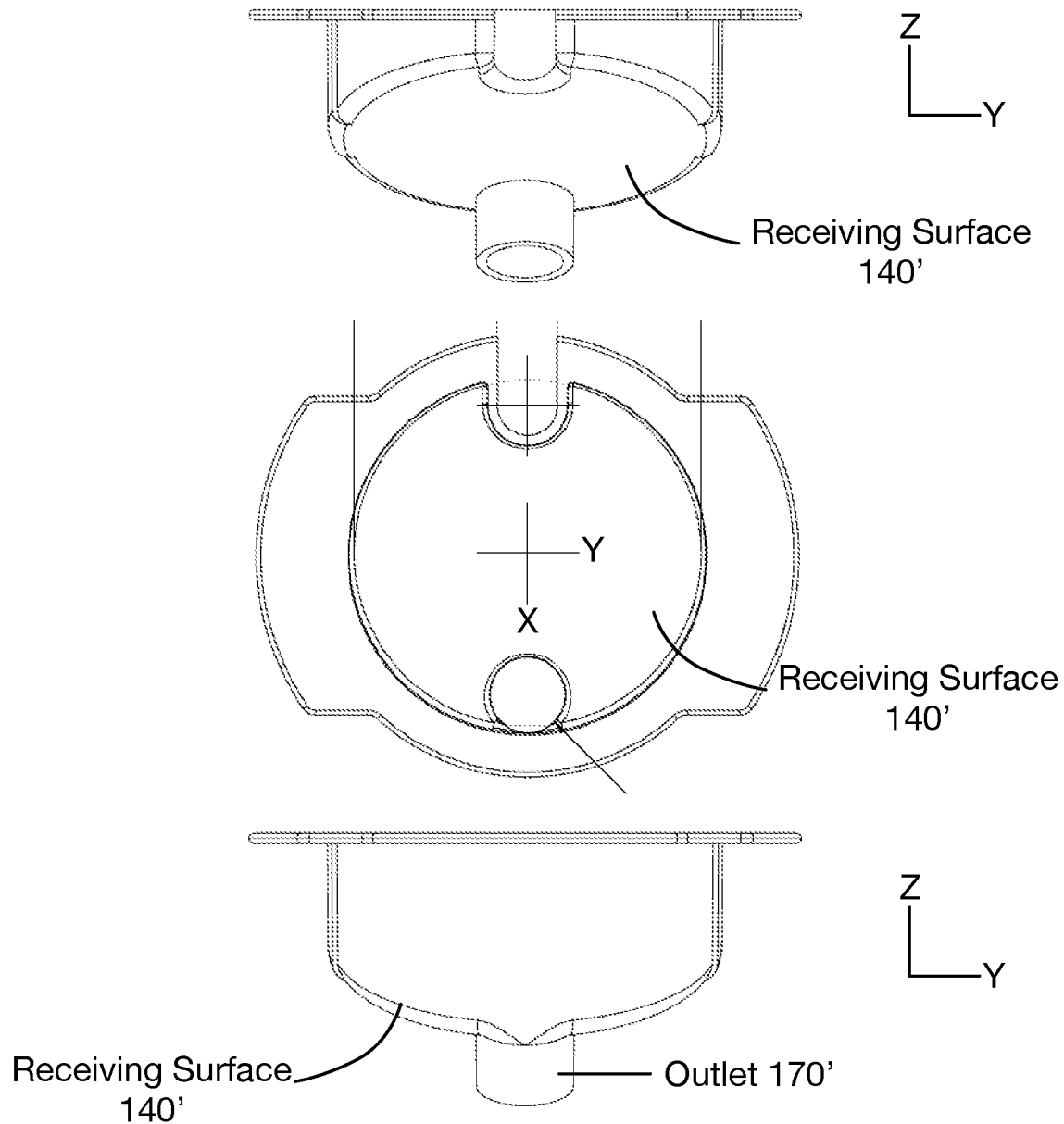

The receiving surface 140 can further be planar or non-planar. For instance, as shown in FIGS. 1A and 2A-2C, the receiving surface 140, 140' can be non-planar in a cross section taken across a plane normal to the direction of the axis along which the receiving surface 140 slopes. In variations, the receiving surface 140 can have local minima, local maxima, peaks and/or valleys, and/or include one or more concave regions and convex regions, for instance, to facilitate manufacturing and/or guide fluid flow along the receiving surface 140 to the outlet 170. As shown in FIG. 2C (bottom), the receiving surface 140' can be non-planar in cross section parallel to the Y-Z plane, and can be concave (e.g., include a valley) in a cross section parallel to the Y-Z plane. In the example shown in FIG. 2C, the concavity of the receiving surface is configured to facilitate manufacturing (e.g., in relation to draft angles for polymer-manufactured parts) and to guide fluid flow along the receiving surface 140' to the outlet 170'. However, variations of the example of the receiving surface 140 can have another suitable surface morphology (e.g., where the surface is defined by a desired multivariable function).

In variations, the receiving surface 140 can be configured such that received fluids traverse a desired path of flow along the receiving surface toward the outlet. The path of flow can be at the surface or below the surface of the receiving surface (e.g., through an interior cavity or channel of the receiving surface). Additionally or alternatively, the path of flow can be linear, or curved (e.g., with a serpentine flow path or other curved flow path). As such, variations of the receiving surface 140 can include fluidic structures (e.g., channels, etc.) that direct fluid flow along a desired path toward the outlet. In the example shown in FIGS. 2A-2C, the receiving surface 140' provides a linear flow path toward the outlet 170'; however, in other examples, the receiving surface 140 can include serpentine-shaped, curved, and/or angled structures (e.g., channels) configured to direct received fluids along the receiving surface 140 in another manner.

Figure 4A:
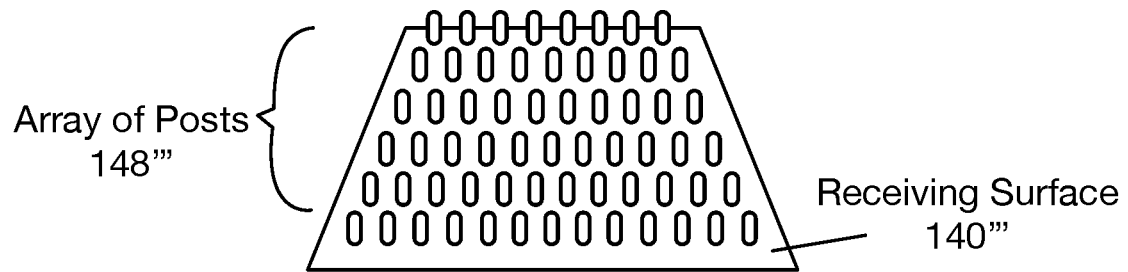
FIGS. 4A-4C depict variations of a receiving surface of a system for receiving and delivering a fluid.
Figure 4B:
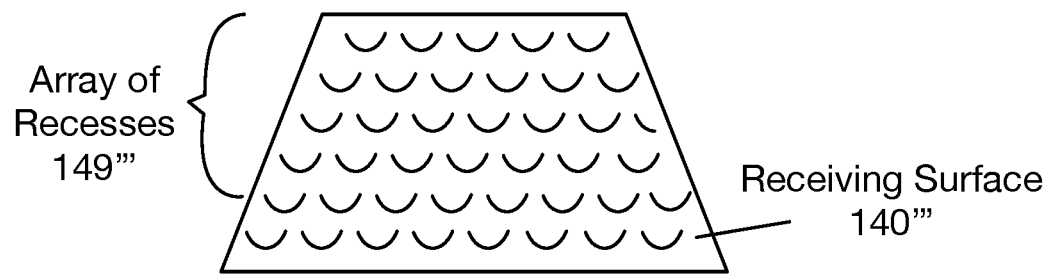
Figure 4C:
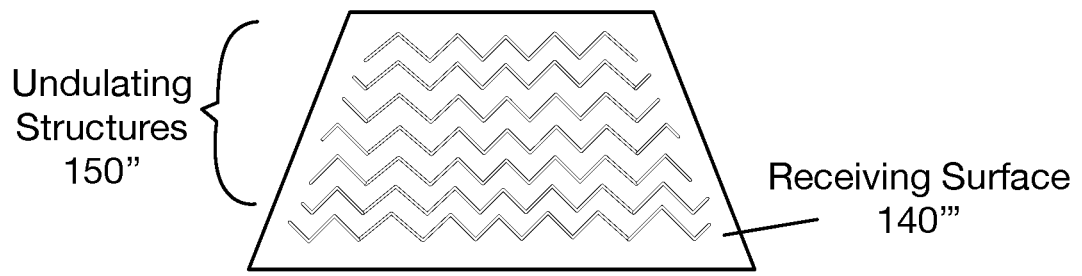

In variations, the receiving surface 140 can include one or more textured regions configured to disrupt or otherwise facilitate removal of bubbles from fluids prior to transmission from the outlet 170 of the receiving surface. The textured region(s) can include a set of protrusions and/or a set of recesses, where the protrusions and/or recesses can be arranged in an organized array or alternatively in a random manner. In one variation, as shown in FIG. 4A, the receiving surface 140''' can include an array of posts 148''' configured to prevent bubble passage or break up bubbles as fluid flows along the receiving surface. In another variation, as shown in FIG. 4B, the receiving surface 140''' can include an array of recesses 149''' configured to provide additional surface area for trapping bubbles. In another variation, as shown in FIG. 4C, the receiving surface 140''' can include a distribution of undulating structures 150''' (e.g., herringbone structures, waved structures, zigzag structures, serpentine structures, etc.) oriented with a flow direction or against a flow direction, in order to break or trap bubbles from flowing fluid. Features of a textured region can be on the order of 1 nm to 100 um; however, variations of the textured surface can have other suitable features and feature dimensions. In addition to removing or altering bubbles coming along fluid dispensed onto receiving surface 140, these textured surfaces may also be used to trap undesired particles or specific particles of certain size that may be present in the dispensed fluid. In another variation, the textured surfaces may have certain affinity molecules that may be used to remove certain molecules or particles from the fluid. In another variation, the textured surface provides enough residence time for the fluid dispensed on it to initiate certain dissolved gas exchanges.

Figure 5A:
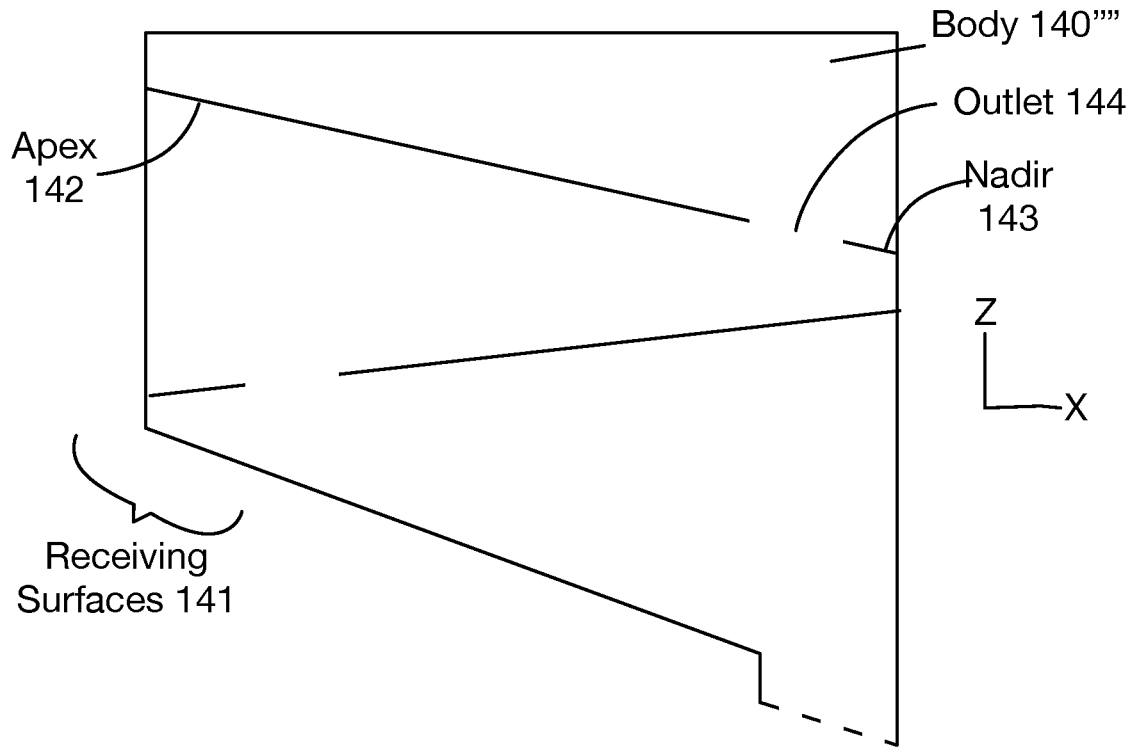
FIGS. 5A-5B depict variations of a set of receiving surfaces of a system for receiving and delivering a fluid.
Figure 5B:
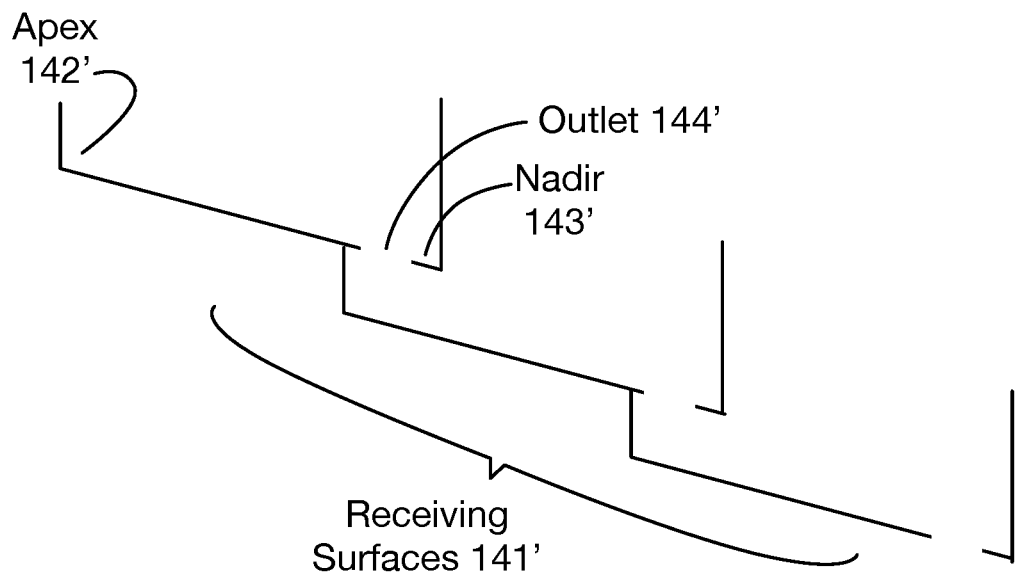

In variations, the body 110 can include a set of receiving surfaces, which function to increase a distance of travel for fluid flow. In one variation, examples of which are shown in FIGS. 5A and 5B, the body 110'''' can include a stack of receiving surfaces 141, 141' configured to provide cascading flow for a received fluid, wherein one or more of the stack of receiving surfaces 141, 141' includes a respective apex 142, 142', a respective nadir 143, 143', and an outlet 144, 144', wherein the outlet allows fluid access to a subsequent receiving surface of the set of receiving surfaces 141. The set of receiving surfaces can be overlapping or non-overlapping, examples of which are depicted in FIGS. 5A (overlapping) and 5B (non-overlapping).

In some embodiments, the receiving surface can also include a vent 160, as shown in FIG. 1A, where the vent 160 functions to enable relief of pressure from the reservoir 50 as the reservoir 50 receives fluid from the outlet 170 of the body 110, or relief of pressure in embodiments where fluid is being drawn from the reservoir 50. In one embodiment, the vent 160 is positioned closer to the apex 145 of the receiving surface 140 than the nadir 147 of the receiving surface 140; however, in other variations, the vent 160 can be positioned at the receiving surface 140, preferably in a manner that does not interfere with or allow premature escape of fluid from the body 110 and into the reservoir 50. In variations, the vent 160 can have a characteristic width or diameter from 0.5 to 10 mm; however, the vent 160 can have other suitable characteristic dimension(s).

As shown in FIGS. 1A, 1B, and 2A-2C, the vent 160 can comprise a partially circular opening into the receiving surface 140; however, in other variations, the vent 160 can have another suitable shape (e.g., ellipsoidal, polygonal, amorphous, etc.). In one variation, the receiving surface 140 can include a single vent 160. In another variation, the receiving surface 140 can include a set of vents 160 (e.g., distributed across the surface of the receiving surface 140). In another variation, the receiving surface can be composed of a material (with suitable thickness and/or porosity) that allows passage of one or more gases (e.g., air), but that does not allow passage of fluids prematurely (e.g., such that fluids are intended to pass through the outlet and into the reservoir 50). In still another variation, the receiving surface can be composed of a material (with suitable thickness and/or porosity) that allows passage of one or more gases and fluids with a desired drip rate, where fluid aggregating at an underside of body 110 opposing the receiving surface 140 can be configured to flow along the underside toward an interior wall of the reservoir in a manner that is substantially free of bubbles. However, other variations of the vent 160 can be configured in another suitable manner.

As shown in the example of FIG. 2A-2C, one or more variations of the vent 160' can include a boundary 162' (e.g., a boundary at least partially formed by the wall 130', a boundary formed by another element, etc.) about the opening of the vent 160, where the boundary 162' prevents fluid received at the body 110 from entering the vent in an undesired manner. However, variations of the vent 160 can alternatively omit a boundary 162'.

In one alternative variation, the vent 160 can include a cover configured to prevent debris or other undesired material from entering the reservoir 50; however, variations of the body 110 can alternatively omit a cover for the vent 160.

In a specific example, as shown in FIG. 2A, the vent 160' is an approximately semicircular opening from the receiving surface 140 into the reservoir 50 (during use), where the vent 160' has a diameter of approximately 3 mm. In the specific example shown in FIG. 2A, the vent 160' is positioned at the apex of the receiving surface 140', such that fluid is not encouraged to flow into the vent 160' (e.g., against gravity). However, variations of the specific example of the vent 160 can be configured in another suitable manner.

As shown in FIG. 1A, the body 110 further includes an outlet 170 positioned closer to the nadir 147 than the apex 145 of the receiving surface 140 and displaced from the vent 160, where the outlet 170 functions to allow fluid flow from the receiving surface 140 and into the reservoir 50. The outlet 170 is preferably dimensioned to prevent accumulation of fluid within the body 110, such that any received fluids do not overflow from the body 110. In variations, the outlet 170 can have a characteristic dimension (e.g., width, diameter) from 0.5 to 10 mm; however, in other variations, the outlet 170 can have another suitable characteristic dimension. In one variation, a cross section of the outlet 170 taken along its length is at least partially circular; however, in other variations, a cross section of the outlet 170 taken along its length can be non-circular, ellipsoidal, polygonal, amorphous, or of another suitable shape. In another variation, the vent may have a porous plug of certain porosity configured to modulate the rate of air venting and/or modulate the flow of constituents of the air (gas constituents and our humidity).

In one variation, the receiving surface 140 can include a single outlet 170. In another variation, the receiving surface 140 can include a set of outlets 170 (e.g., distributed across the surface of the receiving surface 140). In another variation, the receiving surface can be composed of a material (with suitable thickness and/or porosity) that functions as an outlet and allows passage of one or more fluids with a desired drip rate, where fluid aggregating at an underside of body 110 opposing the receiving surface 140 can be configured to flow along the underside toward an interior wall of the reservoir in a manner that is substantially free of bubbles. However, other variations of the outlet 170 can be configured in another suitable manner. In another variation, the outlet 170 can have a porous plug that allows fluid to pass through but retains microparticles and microbubbles.

As shown in FIGS. 1A and 2A-2C, the outlet 170 can include an extension 175 from the body 110, the extension 175 configured to contact an interior wall 57 of the reservoir 50 during operation. In one embodiment, examples and variations of which are shown in FIGS. 1A and 2A-2C, the extension 175 can extend from an underside of the receiving surface 140, to allow drops or streams of a received fluid to be directed along an interior wall of the reservoir 50 during use. As such, the extension 175 can be configured at a peripheral region of the underside of the receiving surface 140, such that fluid is directed from the outlet to the wall of the reservoir 50. Alternatively, the outlet 170 can be configured at a non-peripheral region of the receiving surface 140, with the extension 175 extending toward the interior wall of the reservoir 50 in order to direct fluid along the wall of the reservoir.

Figure 6A:
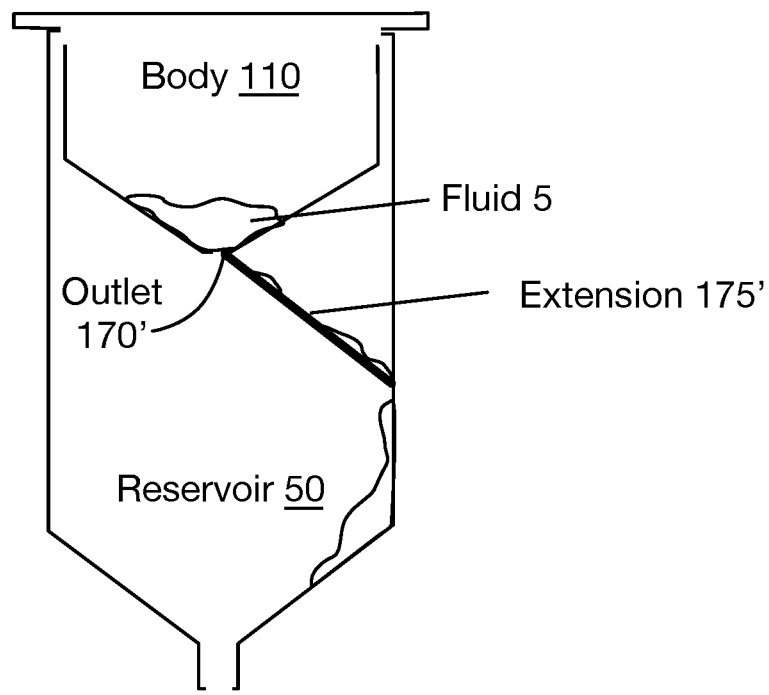
FIGS. 6A and 6B depict variations of an outlet of a system for receiving and delivering a fluid.
Figure 6B:
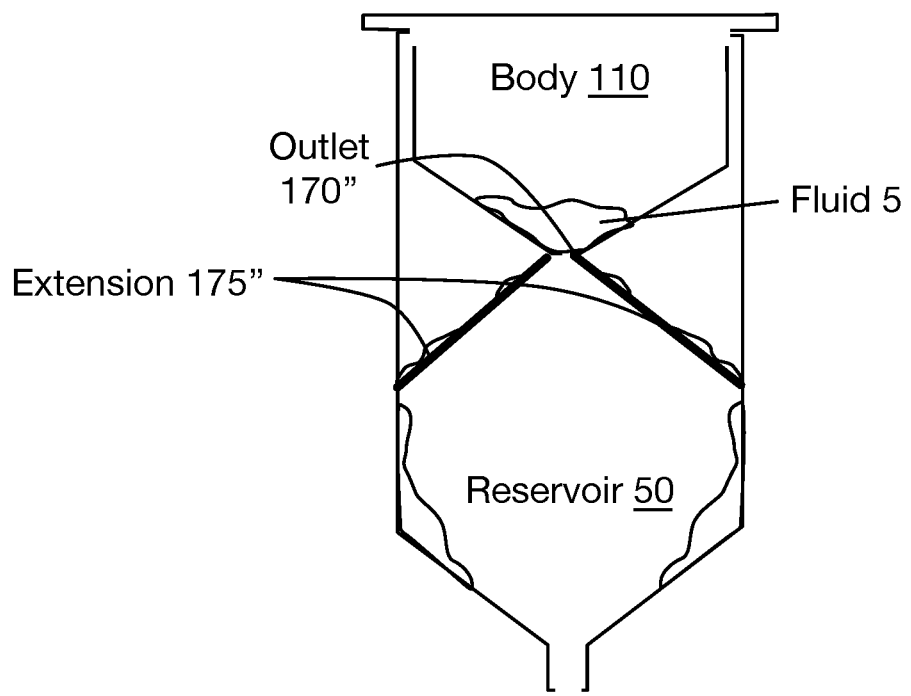
Figure 7:
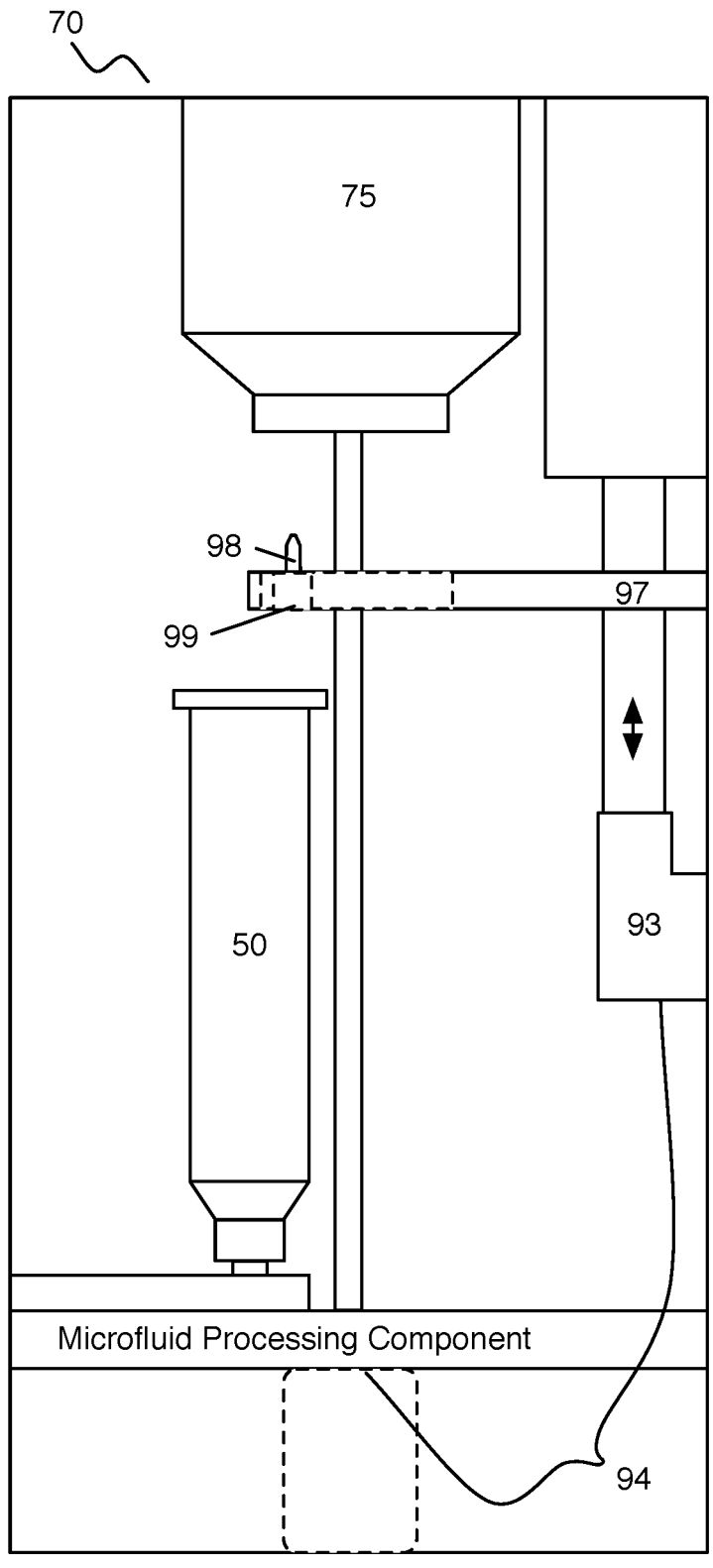
FIG. 7 depicts an embodiment of a fluid delivery system cooperating with a system for receiving and delivering a fluid.
Figure 8A:
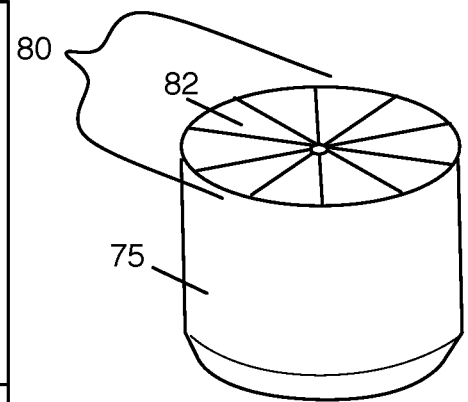
FIGS. 8A-8C depict embodiments of a fluid container cooperating with a system for receiving and delivering a fluid.
Figure 8B:
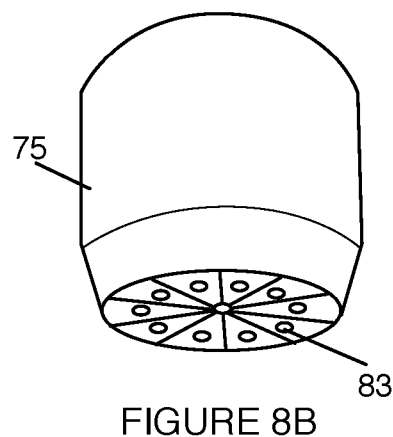
Figure 8C:
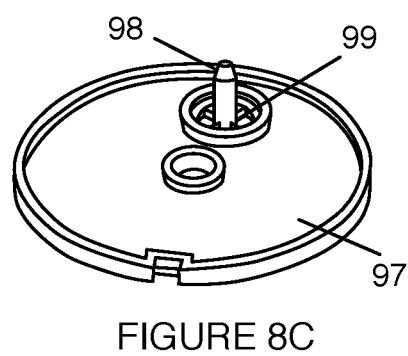

In variations, the extension can be tubular (e.g., to match the boundary of the shape of the opening of the outlet 170. Additionally or alternatively, an example of which is shown in FIG. 6A, the extension 175' can include a rod (e.g., non-tubular structure) extending from the outlet 170' toward the interior wall of the reservoir 50 in order to direct fluid along the wall of the reservoir 50. Additionally or alternatively, in variations, one of which is shown in FIG. 6B, the outlet 170" can include a set of extensions 175" from the outlet 170" and configured to direct fluid toward multiple sites (e.g., multiple contact points of an interior wall of the reservoir) within the reservoir 50.

The extension 175 can extend from the outlet 170 with a length from 1-20 mm, and in the specific example shown in FIG. 2, the extension can have a length of 5 mm. In embodiments, the extension 175 can be uniform in cross section along its length, or can alternatively be non-uniform in cross section along its length. Variations of the body 110 can include more than one extension from the outlet(s); however, some embodiments of the body 110 can omit an extension 175.

In some embodiments, the outlet(s) 170 of the body 110 and/or other openings of the body 110 can include or otherwise be coupled to one or more valves that allow control of fluid flowing into and out from the body 110. In variations, the valve(s) can include one or more of: gate-type valves, globe-type valves, plug-type valves, ball-type valves, butterfly-type valves, check-type valves, diaphragm-type valves, and another suitable valve type for controlling fluid flow into and/or out of the body.

Embodiments, variations, and examples of the system 100 can further include other elements that enable transmission of received fluids in a reduced-bubble state or removed bubble state, in order to execute operation modes described in more detail in Sections 2.3 and 3 below. For instance, in some embodiments, the system 100 can include a cover configured to cover or seal an opening into the body 110 (e.g., to prevent unwanted material from entering the body 110 during or prior to use). Additionally or alternatively, the system 100 can include a funneling element that receives a fluid and directs it into the body toward the apex 145 of the receiving surface 140, in order to provide a longer distance of travel for fluids received at the receiving surface 140. Additionally or alternatively, the system 100 can include a filter upstream of the body 110, where, the filter preprocesses undesired elements from a received fluid prior to the fluid being processed by the body 110. Additionally or alternatively, the system 110 can include a vibrating element, rocking element, sonicating element, or heating element directly or indirectly coupled to the body 110, in order to facilitate bubble removal from fluids contacting the body 110.

However, the system 100 can additionally or alternatively include other suitable elements for fluid processing.

2.2.1 Elevated Container Aspects

As described above and in relation to operation modes of the system described below, the system 100 can be configured to operate in coordination with a fluid delivery module that delivers fluid from a container elevated above the body. The fluid delivery module 70 thus functions to contain and deliver at least one fluid to the reservoir 50, by way of the body 110 (as described), in order to facilitate capture, processing, and/or analysis of singles cells from a biological sample. As shown in FIGS. 7 and 8A-8C, the fluid delivery module 70 can include a cartridge 75 having a set of chambers 80, each chamber 82 in the set of chambers 80 configured to contain a fluid of a set of fluids to facilitate capture and/or analysis of cells. The cartridge 75 can be cylindrical, conical, frustoconical, prismatic, pyramidal, or of any other suitable morphology. Each chamber 82 in the set of chambers 80 is preferably identical to the other chambers, but can alternatively be non-identical to other chambers based on fluid storage requirements (e.g., volume requirements, temperature requirements, light exposure requirements, pressure requirements). The set of fluids preferably comprises reagents including buffers (e.g., priming, wash, and permeabilization buffers), fixing solutions (e.g., pre-fixing and post-fixing solutions), and cocktails (e.g., lysis, inhibitor, primary antibody, and secondary antibody cocktails), and can additionally or alternatively comprise stains (e.g., fluorescent stains or histological stains) and any other suitable fluids for cell capture or analysis. In variations of the system 100 configured to further promote purification of captured cells by magnetic separation, the set of fluids can also comprise solutions of magnetic beads coupled with affinity molecules configured to bind to components of interest (e.g., undesired cells, fragments, waste products) within a biological sample. In one example, a chamber 82 can contain a solution of functionalized magnetic microparticles, configured to bind to target biological material and facilitate separation and/or synthesis of cell-derived materials. In alternative variations, the fluid delivery module 70 can include a single chamber configured to facilitate delivery of a single fluid or multiple fluids to facilitate capture and/or analysis of cells within a biological sample. In other variations, the chamber(s) of the fluid delivery module 70 can be replaced by any suitable fluid conduit(s). For instance, variations of the fluid delivery module 70 can additionally or alternatively include a robotic gantry with aspiration and delivery elements that deliver fluids to the body from an elevated position, in another suitable manner.

The fluid delivery module 70 can include a seal 83, which functions to isolate a fluid within the fluid delivery module 110. In embodiments wherein the fluid delivery module 70 comprises a set of chambers 80, the seal 83 can further function to isolate a fluid of a set of fluids within an individual chamber 82, and to prevent cross-contamination between fluids within chambers of the set of chambers 80, and to prevent evaporative loss during storage and shipment. Preferably, the seal 83 is a puncturable seal comprising a metal foil or any other suitable material, which functions to provide access to at least one fluid within the fluid delivery module 70. However, the seal 83 can alternatively be configured to be non-puncturable, while still facilitating delivery of a fluid to the reservoir 50. Furthermore, the seal 83 can be an element separate from the cartridge 75, or can additionally or alternatively be contiguous with the cartridge 75 (e.g., physically coextensive, of unitary construction. For instance, the seal 83 can include one or more substantially thin sections of the cartridge 75 that can be punctured to provide access to contents of a chamber 82. In one specific variation, a non-puncturable seal can be coupled to a fluid conduit coupled to a chamber of the fluid delivery module 70, wherein the fluid conduit facilitates transfer of a fluid to the reservoir 50.

The fluid delivery module 70 is preferably configured to be prepackaged with at least one fluid (e.g., reagent, buffer, cocktail, stain, magnetic particle solution, etc.) inside a chamber, which functions to facilitate capture and/or analysis of cells of interest according to a specific, pre-defined protocol. Alternatively, the fluid delivery module 70 can be prepackaged in an open or semi-open configuration, such that a user can transfer at least one fluid into at least one chamber 82 of the fluid delivery module 70 to facilitate capture and/or analysis of cells of interest according to a different protocol. Preferably, at least part of the fluid delivery module 70 is configured to be consumable, such that a portion of the fluid delivery module 70 can be disposed of after one use or multiple uses. Alternatively, the fluid delivery module 70 can be configured to be reusable, such that fluids can be repeatedly transferred to a reusable fluid delivery module 70 configured to transfer fluids to the reservoir 50.

In embodiments of the fluid delivery module 70 including a cartridge 75 having a set of chambers 80, each chamber is preferably configured to be isolated from other chambers and individually accessible, which functions to control delivery of a specific fluid to the reservoir 50. In a first variation, the fluid delivery module 70 includes a set of chambers 80, and comprises at least one seal 83 configured to seal the set of chambers 80, thus isolating each chamber in the set of chambers from other chambers. The seal 83 in the first variation is a puncturable foil seal, such that puncturing the seal 83 at a chamber location provides access to the chamber 82. In an example of the first variation, each chamber is sealed at two locations (e.g., an upper surface and lower surface) and puncturing the seal at the two locations exposes the chamber to atmospheric pressure, facilitating delivery of a fluid within the chamber, through a location of puncture, and along an element coupled to the puncturing element, to the body 110 and ultimately to the reservoir 50 by means of hydrostatic pressure. In another example of the first variation, each chamber is sealed and puncturing the seal 83 at a puncture location, while providing a positive pressure at the puncture location (e.g., using a hypodermic needle, using a syringe pump, etc.) facilitates delivery of a fluid within the chamber to body 110 and to the reservoir 50. In yet another example of the third variation, each chamber is sealed and applying negative pressure at a chamber location (e.g., through a valve or an opening) facilitates delivery of a fluid within the chamber to the reservoir 50. Puncturing a seal, applying positive pressure, and/or applying negative pressure at a chamber can be performed manually, or can alternatively be performed automatically using an actuation system configured to enable access to contents of chambers of the cartridge 75. The fluid delivery module 70 can alternatively facilitate individual access and/or isolation of a chamber 82 using any other suitable mechanism or combination of elements.

As shown in FIGS. 7 and 8A-8C, the fluid delivery module 70 can include a substantially cylindrical cartridge 75 having identical isolated chambers 82, each configured to contain a fluid or reagent to facilitate cell capture and/or analysis. In the first specific example, the cylindrical cartridge 75 can have one of an open configuration comprising open chambers, a semi-open configuration comprising open chambers and sealed chambers with prepackaged reagents, and a completely sealed configuration comprising sealed chambers with prepackaged reagents. In semi-open or sealed configurations, sealed chambers are sealed at two ends with a puncturable foil seal, and in open or semi-open configurations, open chambers are sealed at one end with a puncturable foil seal 113. Each of the ten chambers is has a volumetric capacity of 4-6 mL and has a wedge-shaped cross section that is substantially uniform along a majority of a 2" length. In the first specific example, the cartridge 85" has a bevel at an inferior region of the cartridge 75 in order to facilitate fluid flow toward an inferior region of the cartridge 105, proximal the seal 83.

The fluid delivery module 70 can also be coupled to an actuation system 94 configured to individually access each chamber of the cylindrical cartridge, in order to facilitate automatic delivery of a fluid within each chamber to the reservoir 50. The actuation system 94 can include a rotary shaft driven by a stepper motor, wherein the rotary shaft is mounted to the cylindrical cartridge such that the chambers surround the axis of rotation of the rotary shaft. This configuration, along with the stepper motor, functions to allow determination of the positions of the chambers as the cartridge 75 rotates during operation. The actuation system 94 of the first specific example can also include a first actuator 97 configured to provide relative displacement between a first piercer 98 and the cartridge 75, in order to facilitate piercing of a seal 83 of a chamber 82 of the cartridge 75. In the first specific example, the first piercer 98 is situated inferior to the cartridge 75, and comprises a puncturing tip that aligns with chambers 82 of the cartridge 75 in different rotational configurations of the cartridge 75, wherein the puncturing tip 98 is proximal to (e.g., concentric with) and coupled to (e.g., contiguous with) a boundary of an aperture 99 of the first piercer 98. As such, piercing of a seal 83 of the cartridge 75 at a chamber location, by way of the puncturing tip 98, facilitates flow of contents of the chamber(s) 82 through the aperture 99 of the first piercer 98 and into a reservoir 50 configured to receive chamber contents. In some variations, the puncturing tip 98 may also have an opening (e.g., an opening into a vertical channel, a slanted channel, or a channel with any other suitable orientation or path) to allow fluid to flow from the cartridge 75 to the reservoir 50. Additionally or alternatively, the structure of the puncturing tip can extend below the surface of the first piercer 98 to allow fluid to drip in a guided fashion toward the reservoir 50.

In one variation of the first specific example, the actuation system 94 can displace the piercer 98 relative to the cartridge 75 (e.g., in a vertical direction, in a non-vertical inferior-superior direction) in order to drive the piercer 98 into a seal 83 of the cartridge 75. In this variation, the first piercer 98 can be coupled to a drip plate 93 that facilitates fluid delivery into the reservoir 50. In another variation of the first specific example, the actuation system 94 can displace the cartridge 75 relative to the piercer 98 (e.g., in a vertical direction, in a non-vertical inferior-superior direction), in order to drive the seal 83 of the cartridge toward the puncturing tip of the piercer 98. In still other variations of the first specific example, the actuation system 94 can displace one or both of the cartridge 75 and the piercer 98 in any other suitable direction (e.g., vertical direction, a direction angularly displaced from a vertical direction, a horizontal direction) in order to enable piercing of a seal 83 of the cartridge 75. As such, in some variations of the first specific example, the cartridge 75 and/or the piercer 98 can be tilted away from a vertical or horizontal configuration. In tilted variations, fluid flow can be facilitated by gravity and/or application of positive or negative pressure to a chamber 82 of the cartridge 75.

In the first specific example, rotation of the cartridge positions a desired chamber 82 directly into alignment with (e.g., directly over) a reservoir 50 configured to receive and distribute contents of the chamber 82 into a manifold; however, in variations of the first specific example, the cartridge 75, the chamber 82, and/or the reservoir 50 may be out of alignment (e.g., offset), but fluidly coupled in any suitable manner to facilitate fluid flow from a chamber 82 to the reservoir 50. Furthermore, still other variations of the first and the second specific examples can omit rotation of a cartridge 75, or can additionally or alternatively include translation of a cartridge (e.g., in X, Y, and/or Z directions) to align desired cartridge chambers 82 for delivery of processing fluids to a reservoir 130, and/or transfer of fluids from a stationary cartridge or reagent container.

Embodiments, variations, and examples of fluid delivery are further described in one or more of: U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; U.S. application Ser. No. 15/815,532, filed 16 Nov. 2017; and U.S. application Ser. No. 16/115,370, filed 28 Aug. 2018, which are each incorporated in their entirety by this reference.

2.3 System—Operation Modes with Elevated Container

In various modes, of operation, the system 100 has specific structural configurations that transmit fluid, initially having a distribution of bubbles, or bubbles created during the delivery of the fluid from the elevated container to downstream fluid containers and channels in a substantially bubble-free (or bubble-reduced) state. In one such embodiment, as shown in FIG. 1B, the system 100 can include: a bubble-mitigating operation mode 210 in which the receiving surface 140 receives the fluid 5 from a container 10 (e.g., such as cartridge 75 described above) elevated above the body 110 and transmits the sample processing fluid 5 along the receiving surface 140 toward the nadir 147, thereby transitioning the fluid 5 from a bubble-rich state to a reduced-bubble state, and a fluid-transmitting operation mode 220 in which the receiving surface 140 directs the fluid 5, in the reduced-bubble state, through the outlet 170, along the extension 175, and along the interior wall 57 of the reservoir 50 toward a base 59 of the reservoir 50 in a bubble-free state.

As described above, in the bubble-mitigating operation mode 210, the receiving surface 140 receives the fluid 5 from a container 10 (e.g., such as cartridge 75 described above) and transmits the sample processing fluid along the receiving surface 140, thereby transitioning the sample processing fluid 5 from a bubble-rich state to a reduced-bubble state. In the bubble-mitigating operation mode 210, the body 110 is preferably coupled with the reservoir 50, and as described above, can be mated with the reservoir 50, seated upon the reservoir 50 with the outlet 170 configured to direct fluid into the reservoir 50, seated within an opening of the reservoir, or otherwise coupled to the reservoir in another suitable manner. However, the body can alternatively be uncoupled from the reservoir and alternatively situated in position such that the outlet transmits fluid into the reservoir without coupling between the body and the reservoir.

In the bubble-mitigating operation mode 210, a fluid received at the receiving surface 140 flows along the receiving surface. In variations, the receiving surface 140 can transmit the fluid(s) (e.g., with the direction of gravity, against the direction of gravity in variations where the receiving surface 140 has one or more uphill portions) toward the outlet 170. Additionally or alternatively, in variations, the receiving surface 140 can transmit the fluid(s) along one or more textured portions of the receiving surface, in order to trap or break bubbles of the fluid(s).

In the bubble-mitigating operation mode 210, a level sensor in communication with the body 110 can generate signals indicating a level of fluid within the body 110, and a processor in communication with the system 100 can control flow rate of the fluid being transmitted into the body 110. The level sensor and/or other sensors can also generate signals indicative of an amount of bubbles within the fluid(s) received, in order to guide further transmission of fluids downstream. For instance, information derived from the sensor(s) can be used to evaluate fluid quality in relation to bubble presence or other fluid features, and enable further transmission of fluid downstream once quality of the fluid has surpassed a threshold. However, flow of fluid into and out of the body 110 can additionally or alternatively be regulated in another manner.

In some embodiments of the bubble-mitigating operation mode 210, the body 110 can cooperate with a sonication or other actuation system (e.g., rocker, shaker, etc.) configured to transmit forces, through the body 110, and to the fluid(s) received, in order to break up bubbles prior to further downstream transmission. However, the system 210 can additionally or alternatively include other suitable features for reducing an amount of bubbles present in fluids received at the receiving surface 140.

Also described above, in the fluid-transmitting operation mode 220 the receiving surface 140 directs the fluid 5, in the reduced-bubble state, through the outlet 170 into the reservoir 50 in a bubble-free state (or otherwise significantly-reduced bubble state). In the fluid-transmitting operation mode 220, the extension 175 of the outlet 170 into the reservoir 50 is preferably configured to direct fluid from the outlet 170 along an interior wall of the reservoir, such that it collects, in a bubble-free manner, at a base of the reservoir for downstream applications.

Preferably, in the fluid-transmitting operation mode 220, flow from the outlet is at a rate that prevents buildup and overflow of fluid within the body, and also at a rate that does not further create bubbles as the fluid is being transmitted from the outlet 170 into the reservoir. In variations, the flow rate from the outlet is from 0.01 mL/s to 5 mL/s; however, the system 100 can alternatively be configured to provide other flow rates based on modifications to system aspects (e.g., pressurized flow, outlet dimensions, etc.).

As described above, based on variations of the outlet 170 and extension(s) 175, the fluid-transmitting operation mode 220 can be configured to transmit fluid from multiple outlets and/or along multiple extension(s) into the reservoir 50.

In variations where the body 110 and/or outlet 170 is coupled to one or more valve(s), in the fluid-transmitting operation mode 220, the valve can be configured to transition to an open state (e.g., from a closed state) by one or more of: mechanical operation, pressurization, dissolving of a blocking substance, melting of a blocking substance, and any other suitable valve opening mechanism. For instance, in cooperation with level sensors or other sensors configured to interrogate or observe fluid status and quality prior to transmission into the reservoir 50, the system 100 can be configured (e.g., through a controller) with instructions for transitioning the valve(s) to open states upon determination that fluid quality is sufficient for further use.

Variations of the system 100 can, however, include other element(s) and/or operation modes for enabling transmission of fluid of sufficient quality for downstream applications. The embodiments of the system 100 described are configured to perform the method(s) described below, and/or can be configured to perform other suitable methods.

3. Method

Figure 9:
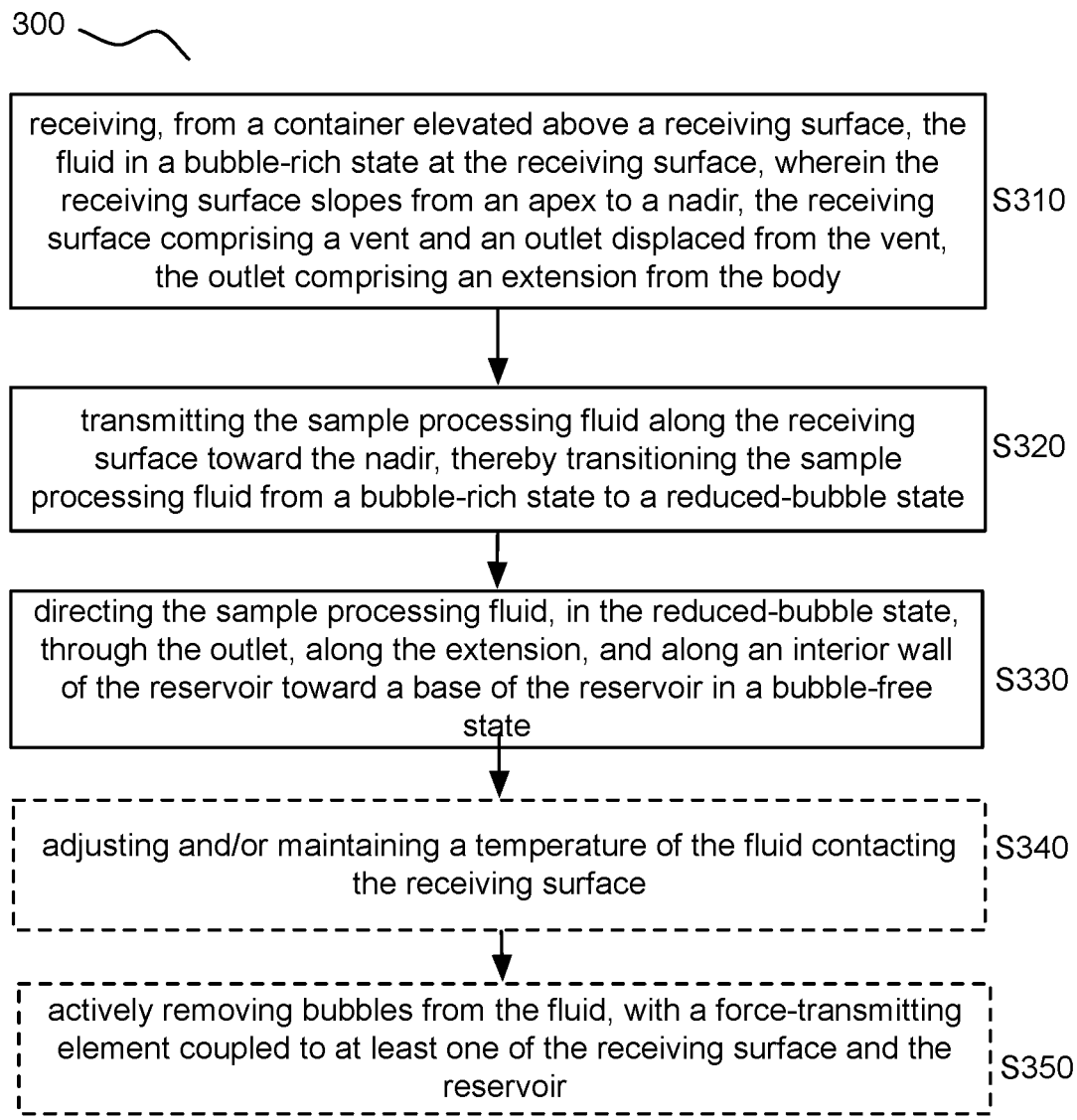
FIG. 9 depicts a flowchart of an embodiment of a method for receiving and delivering a fluid.

As shown in FIG. 9, an embodiment of a method 300 for receiving and delivering a fluid includes: receiving, from a container elevated above a receiving surface, the fluid in a bubble-rich state at the receiving surface, wherein the receiving surface slopes from an apex to a nadir along a first direction, the receiving surface comprising a vent and an outlet positioned closer to the nadir than the apex and displaced from the vent, the outlet comprising an extension from the body S310; transmitting the sample processing fluid along the receiving surface toward the nadir, thereby transitioning the sample processing fluid from a bubble-rich state to a reduced-bubble state S320; and directing the sample processing fluid, in the reduced-bubble state, through the outlet, along the extension, and along an interior wall of the reservoir toward a base of the reservoir in a bubble-free state S330. Variations of the method 300 can additionally or alternatively include other steps for transmitting fluid for processing in a desired state, including one or more of: adjusting and/or maintaining a temperature of the fluid contacting the receiving surface S340; and actively removing bubbles from the fluid, with a force-transmitting element (e.g., force-transmitting element 117 shown in FIG. 1A) coupled to at least one of the receiving surface and the reservoir S350.

The method 300 functions to significantly remove or reduce in number a distribution of bubbles from within a fluid, where the fluid is intended to be transmitted into microfluidic structures of a device for processing cells in single-cell format. As such, the method provides steps for receiving a fluid (e.g., sample fluid, sample processing fluid) having bubbles, efficiently removing bubbles from the fluid, and ultimately transmitting the fluid toward microfluidic structures to improve sample processing outcomes. The method 300 can be implemented by system components described above, and/or can additionally or alternatively be implemented using other system components.

Block S310 recites: receiving, from a container elevated above a receiving surface, a fluid in a bubble-rich state at the receiving surface, wherein the receiving surface slopes from an apex to a nadir along a first direction. Block S310 functions to transition a fluid (e.g., sample processing fluid, other sample fluid) from a bubble-rich state to a reduced-bubble state by transmitting fluid from the elevated container to the reservoir by way of an intermediate body. As described above, the receiving surface can include a vent and an outlet positioned closer to the nadir than the apex and displaced from the vent, the outlet comprising an extension from the body. System aspects are further described above and in relation to subsequent steps of the method 300.

In relation to performing Block S310, the system and associated elements can transition into operation modes in which elements (e.g., fluid delivery module, cartridge, actuation system, piercer, etc.) cooperate to release the fluid(s) from the container(s) from a position above the reservoir (in the orientation shown in the FIGURES). Furthermore, in relation to Block S310, the body (described above) is preferably coupled with the reservoir, and can be mated with the reservoir, seated upon the reservoir with the outlet configured to direct fluid into the reservoir, seated within an opening of the reservoir, or otherwise coupled to the reservoir in another suitable manner. However, the body can alternatively be uncoupled from the reservoir and alternatively situated in position such that the outlet transmits fluid into the reservoir without coupling between the body and the reservoir.

As such, variations of Block S310 can include releasing fluid from the container, such that it falls into the body and toward the receiving surface. In variations, releasing fluid from the container can include one or more of: rotating the container (e.g., cartridge) and puncturing a seal of the container in order to release fluid from the container, where associated system components of embodiments, variations, and examples are described above; aspirating and/or delivering fluid from a fluid receptacle in another manner (e.g., using a pipetting system, using a robot module, using a gantry, etc.); allowing to flow under passive or active force (e.g., gravity, pressurization, etc.); and/or transmitting fluid to the receiving surface in another suitable manner.

In some variations, Block S310 can include generating, by way of a sensor (e.g., level sensor) in communication with the body and/or receiving surface, one or more signals indicating a level of fluid associated with the body and receiving surface. Block S310 can include controlling flow rate of the fluid being transmitted into the body. In relation to Block S310, the level sensor and/or other sensors can also generate signals indicative of an amount of bubbles within the fluid(s) received, in order to guide further transmission of fluids downstream. For instance, information derived from the sensor(s) can be used to evaluate fluid quality in relation to bubble presence or other fluid features, and enable further transmission of fluid downstream once quality of the fluid has surpassed a threshold (e.g., using one or more valves, as described above). However, flow of fluid into and out of the body can additionally or alternatively be regulated in another manner.

Block S320 recites: transmitting the sample processing fluid along the receiving surface toward the nadir, thereby transitioning the sample processing fluid from a bubble-rich state to a reduced-bubble state. Block S320 functions to remove bubbles from the fluid for further transmission. In Block S320, the receiving surface transmits the fluid along its surface, and in variations, the receiving surface can transmit the fluid(s) (e.g., with the direction of gravity, against the direction of gravity in variations where the receiving surface has one or more uphill portions) toward the outlet.

In Block S320, the receiving surface can transmit the fluid along a sloping surface, where angles of slope can depend on fluid characteristics (e.g., viscosity, etc.) as described above. Additionally or alternatively, the receiving surface can transmit the fluid along a linear or non-linear path, where the distance of flow can be configured to further facilitate bubble removal or trapping prior to fluid transmission from the outlet. In a specific example, Block S320 includes transmitting the fluid at an angle of approximately 23 degrees (e.g., sloping down from a horizontal axis) toward the outlet; however, other variations can include transmitting the fluid at another suitable angle.

Additionally or alternatively, in variations, Block S320 can include transmitting the fluid(s) along one or more textured portions of the receiving surface, in order to disrupt, trap, or break bubbles of the fluid(s). In variations, protruding and/or recessed features of the receiving surface can be configured to retain bubbles and/or break bubbles within the fluid(s) received prior to transmission from the outlet.

Additionally or alternatively, the body can transmit the fluid along multiple receiving surfaces (e.g., in a cascading flow), where example system configurations for providing such flow are described above. In relation to Block S320, transmitting the fluid along multiple receiving surfaces in series can provide a longer distance of travel and/or adjust speed of fluid movement in a manner that promotes transmission of fluid having desired quality from the outlet of the body.

Block S330 recites: directing the sample processing fluid, in the reduced-bubble state, through the outlet, along the extension, and along an interior wall of the reservoir toward a base of the reservoir in a bubble-free state. Block S330 functions to transmit the fluid from the body and into the reservoir, such that the fluid can be used for sample processing (e.g., within microfluidic structures) with desired results.

Block S330 can thus include transmitting fluid from the outlet, and along the extension of the outlet into the reservoir, where transmitting fluid includes directing fluid from the outlet along an interior wall of the reservoir, such that it collects, in a bubble-free manner, at a base of the reservoir for downstream applications. Block S330 can include transmitting fluid from the outlet at a rate that prevents buildup and overflow of fluid within the body, and also at a rate that does not further create bubbles as the fluid is being transmitted from the outlet into the reservoir. In variations, the flow rate from the outlet is from 0.01 mL to 5 mL/s; however, Block S330 can alternatively be configured to provide other flow rates based on modifications to system aspects (e.g., pressurized flow, outlet dimensions, etc.).

Based on variations of the outlet and extension(s), Block S330 can additionally or alternatively include transmitting fluid from multiple outlets and/or along multiple extension(s) into the reservoir. For instance, Block S330 can include transmitting fluid from one or more outlets and along more than one extension from the outlet(s) to the wall of the reservoir (e.g., at multiple points of contact at the wall of the reservoir).

In variations where the body and/or outlet is coupled to one or more valve(s), Block S330 can include transitioning the valve to an open state (e.g., from a closed state) by one or more of: mechanical operation, pressurization, dissolving of a blocking substance, melting of a blocking substance, and any other suitable valve opening mechanism. Additionally or alternatively, in cooperation with level sensors or other sensors configured to interrogate or observe fluid status and quality prior to transmission into the reservoir, Block S330 can include transitioning the valve(s) to open states upon determination that fluid quality is sufficient for further use, and allowing fluid to flow past the valves from the outlet(s).

As described above, variations of the method 300 can additionally or alternatively include Block S340, which recites: adjusting and/or maintaining a temperature of the fluid contacting the receiving surface. Block S340 functions to functions to prevent fluid from transitioning to an undesired temperature prior to transmission for use in sample processing in subsequent steps. In variations, Block S340 can include one or more of: transmitting heat to the body/receiving surface (e.g., using a contact or non-contact heating apparatus coupled to the body/receiving surface/outlet, where a temperature of the fluid is detected using a sensor); transmitting heat away from the body/receiving surface (e.g., using a contact or non-contact heat sink/cooling subsystem in communication with the body/receiving surface); or otherwise maintaining temperature of the fluid, through the body/receiving surface in another suitable manner.

As described above, variations of the method 300 can additionally or alternatively include Block S350, which recites: actively removing bubbles from the fluid, with a force-transmitting element coupled to at least one of the receiving surface and the reservoir. Block S350 functions to actively break bubbles from within the fluid. In some embodiments of Block S350, the body can cooperate with or be coupled to a sonication or other actuation system (e.g., rocker, shaker, etc.) configured to transmit forces, through the body, and to the fluid(s) received, in order to break up bubbles prior to further downstream transmission. However, Block S350 can additionally or alternatively include other suitable steps for reducing an amount of bubbles present in fluids received at the receiving surface.

The method 300 can, however, additionally or alternatively include other steps for receiving and transmitting fluids from a container and into microfluidic structures in a reduced bubble state, to facilitate sample processing.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for receiving and delivering a fluid, the system comprising:
   a body configured to interface with an opening of a reservoir and defining:
      a protrusion defining a set position of the body relative to the opening of the reservoir;
      a wall extending from the protrusion;
      a receiving surface coupled to the wall and sloping from an apex to a nadir along a first direction, the receiving surface comprising a vent; and
      an outlet positioned closer to the nadir than the apex of the receiving surface and displaced from the vent, the outlet comprising an extension from the body, the extension configured to contact an interior wall of the reservoir,
   wherein the body is thermally coupled to a heating or cooling element, which comprises a thermal control operation mode in which the heating or cooling element controls a temperature of the fluid contacting the body, and wherein the body comprises:
      a bubble-mitigating operation mode in which the receiving surface receives the fluid from a container elevated above the body and transmits the fluid along the receiving surface toward the nadir, thereby transitioning the sample processing fluid from a bubble-rich state to a reduced-bubble state, and
      a fluid-transmitting operation mode in which the body directs the fluid, in the reduced-bubble state, through the outlet, along the extension, and along the interior wall of the reservoir toward a base of the reservoir in a bubble-free state.

2. The system of claim 1, wherein the receiving surface is concave in a cross section taken across a plane normal to the first direction.

3. The system of claim 1, wherein the receiving surface comprises a textured region comprising at least one of: a set of recesses and a set of protrusions configured to disrupt bubbles from the fluid.

4. The system of claim 1, wherein the protrusion positions the receiving surface within the reservoir, with the extension of the outlet directing a stream of the fluid to the interior wall of the reservoir during operation.

5. The system of claim 1, wherein the receiving surface slopes from a horizonal plane at an angle from 10-50 degrees from the apex to the nadir.

6. The system of claim 1, wherein the body comprises a set of surfaces comprising the receiving surface, each of the set of surfaces comprising a respective outlet and configured such that an upstream outlet transmits the fluid toward a downstream surface of the set of surfaces.

7. The system of claim 1, wherein the vent comprises a boundary at least partially formed by the wall of the body.

8. The system of claim 1, wherein the extension extends from a side of the body opposing the receiving surface and toward the interior wall of the reservoir.

9. The system of claim 1, wherein the body comprises a set of extensions coupled to one or more outlets comprising the outlet, and wherein the set of extensions extend from the one or more outlets toward a set of contact positions of the interior wall of the reservoir.

10. The system of claim 1, wherein the vent is positioned at the apex of the receiving surface and wherein the outlet is positioned at the nadir of the receiving surface.

11. The system of claim 1, further comprising a force-transmitting element coupled to the body and configured to transmit force to the fluid for actively disrupting bubbles of the fluid.

* * * * *